US012620516B2

(12) United States Patent
Takeuchi

(10) Patent No.: US 12,620,516 B2
(45) Date of Patent: May 5, 2026

(54) MULTILAYER ELECTRONIC COMPONENT

(71) Applicant: TAIYO YUDEN CO., LTD., Tokyo (JP)

(72) Inventor: Hirotaka Takeuchi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 827 days.

(21) Appl. No.: 17/900,338

(22) Filed: Aug. 31, 2022

(65) Prior Publication Data

US 2023/0102566 A1     Mar. 30, 2023

(30) Foreign Application Priority Data

Sep. 28, 2021     (JP) ................................. 2021-157584

(51) Int. Cl.
| | |
|---|---|
| *H01F 17/00* | (2006.01) |
| *H01F 17/02* | (2006.01) |
| *H01G 4/012* | (2006.01) |
| *H01G 4/12* | (2006.01) |
| *H01G 4/40* | (2006.01) |

(52) U.S. Cl.
CPC ......... *H01F 17/0013* (2013.01); *H01F 17/02* (2013.01); *H01G 4/012* (2013.01); *H01G 4/12* (2013.01); *H01G 4/40* (2013.01); *H01F 2017/0026* (2013.01)

(58) Field of Classification Search
CPC ................. H01F 17/0013; H01F 17/02; H01F 2017/0026; H01G 4/012; H01G 4/12; H01G 4/40
USPC ................................................. 336/200, 232
See application file for complete search history.

(56) References Cited

U.S. PATENT DOCUMENTS

| | | | |
|---|---|---|---|
| 5,945,892 A | 8/1999 | Kato et al. ..................... | 333/185 |
| 2015/0028969 A1* | 1/2015 | Watanabe ........... | H03H 7/0115 |
| | | | 333/185 |
| 2019/0333691 A1 | 10/2019 | Masuda | |

FOREIGN PATENT DOCUMENTS

| | | | | |
|---|---|---|---|---|
| CN | 203734631 U | * | 7/2014 | .......... H03H 7/0115 |
| CN | 118487571 A | * | 8/2024 | .............. H03H 1/00 |
| JP | H 09-238040 A | | 9/1997 | |

(Continued)

OTHER PUBLICATIONS

Notice of Reasons for Refusal issued on Apr. 30, 2025 in counterpart Japanese Patent Application No. 2021-157584.

*Primary Examiner* — Lincoln D Donovan
(74) *Attorney, Agent, or Firm* — Stein IP, LLC

(57)     ABSTRACT

A multilayer electronic component includes a multilayer structure that includes dielectric layers stacked in a stack direction and has first and second surfaces provided on respective sides in the stack direction, a first side-surface electrode provided on a side surface of the multilayer structure, an inductor provided in the multilayer structure, a capacitor provided between the inductor and the first surface, a via wiring line penetrating dielectric layers from a first dielectric layer, which is in contact with the inductor, to a second dielectric layer, which is located closer to the first surface than at least a part of the capacitor, and electrically connecting a first end of the inductor and the first side-surface electrode, and a second side-surface electrode electrically connected to the first side-surface electrode through the inductor and the via wiring line and provided on the side surface or another side surface of the multilayer structure.

10 Claims, 19 Drawing Sheets

(56)         References Cited

FOREIGN PATENT DOCUMENTS

| JP | 2009-159328 A | 7/2009 | | |
| JP | 2013-150100 A | 8/2013 | | |
| JP | 5598548 B2 * | 10/2014 | .............. | H03H 7/09 |
| JP | 2017-212717 A | 11/2017 | | |
| JP | WO 2018/142667 A1 | 8/2018 | | |

* cited by examiner

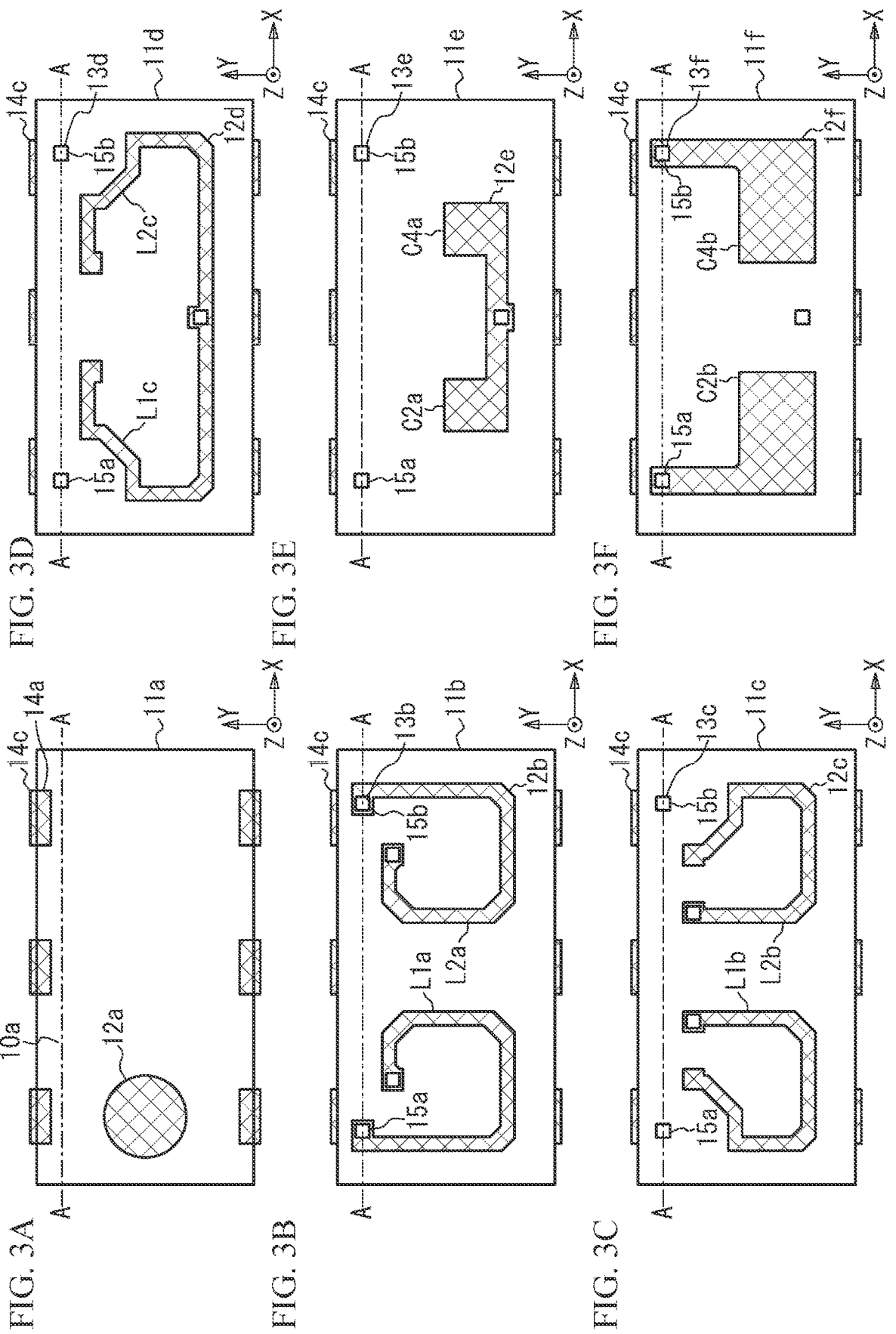

FIG. 4A
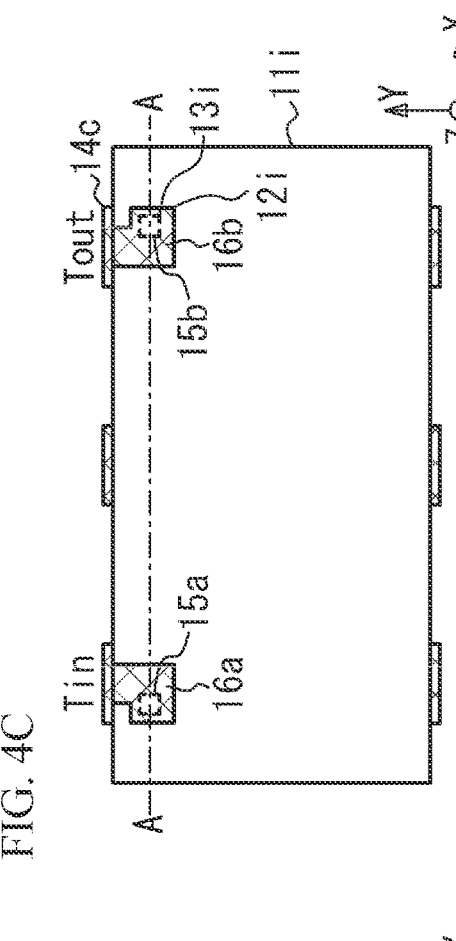
FIG. 4B
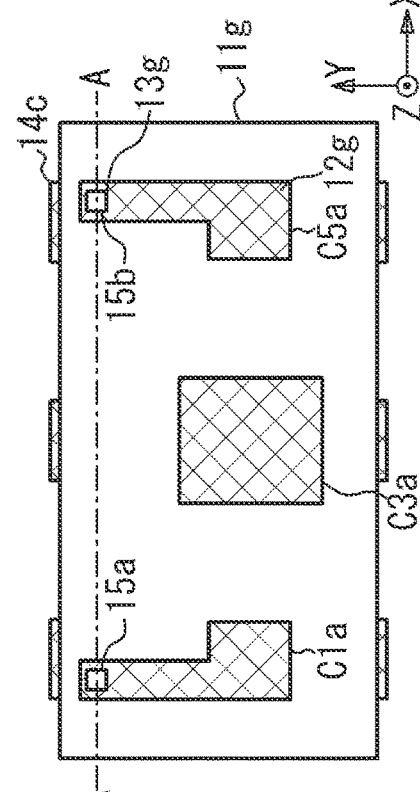
FIG. 4C
FIG. 4D
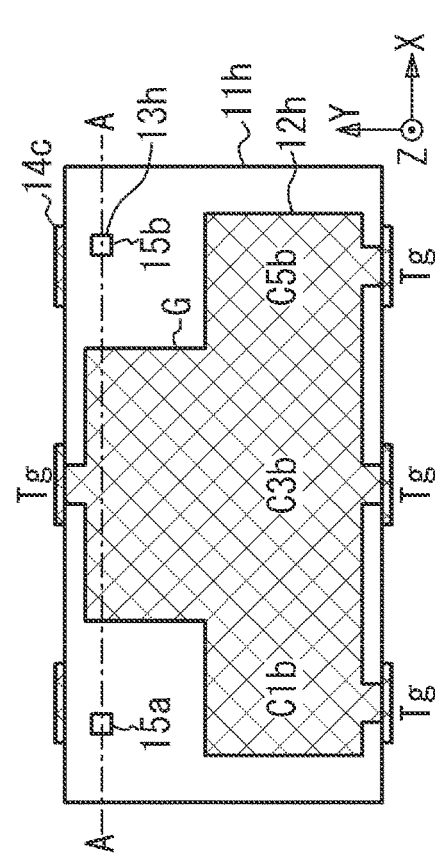

FIG. 10C
FIG. 10D
FIG. 10A
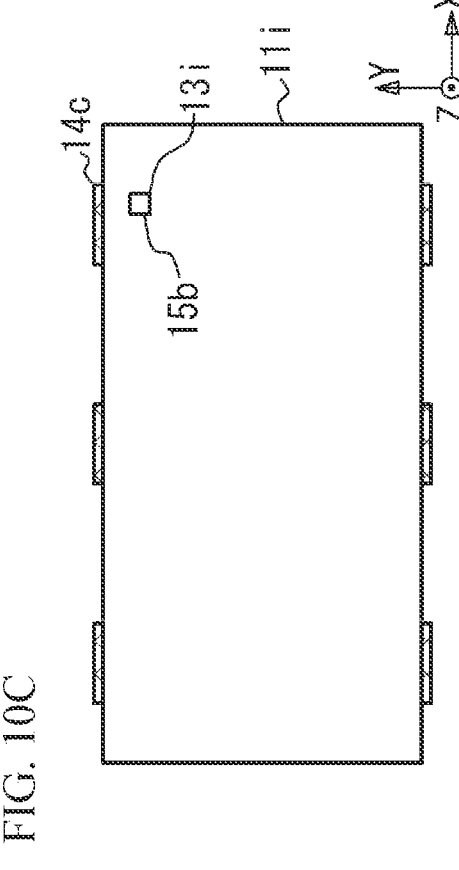
FIG. 10B
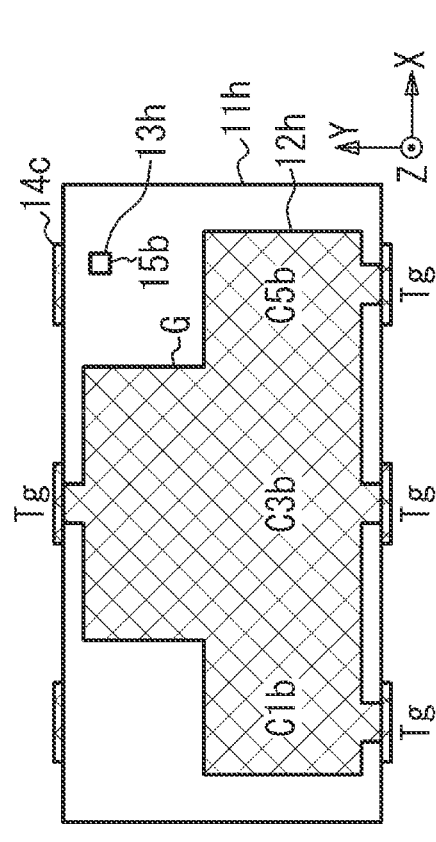

FIG. 16A
FIG. 16C
FIG. 16B
FIG. 16D
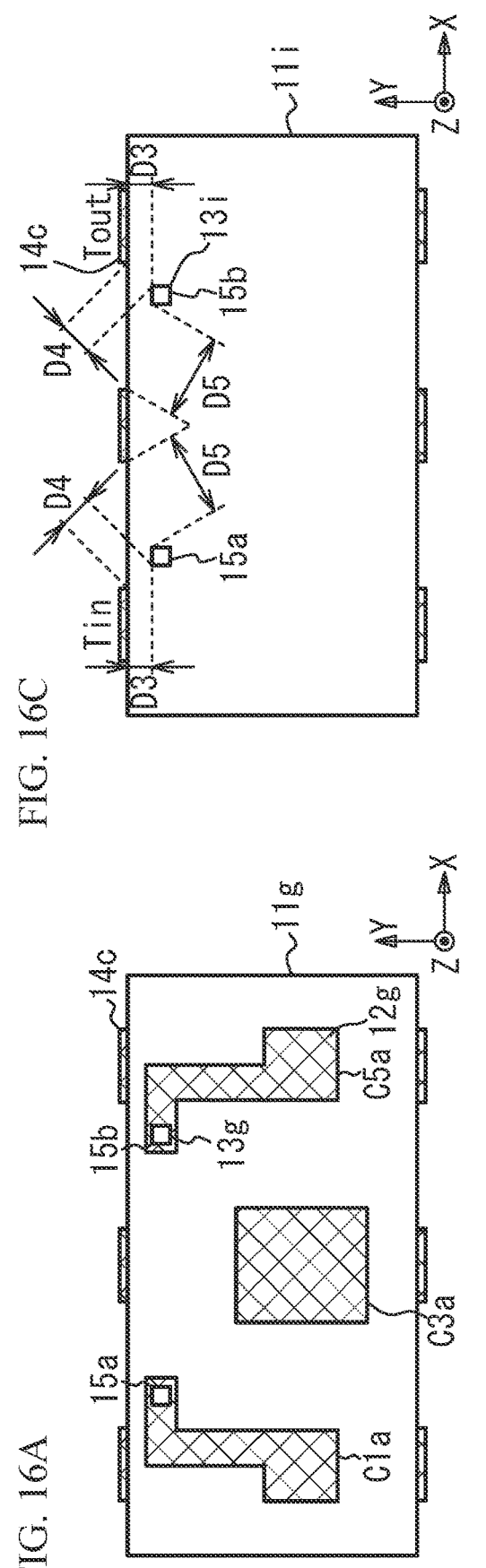
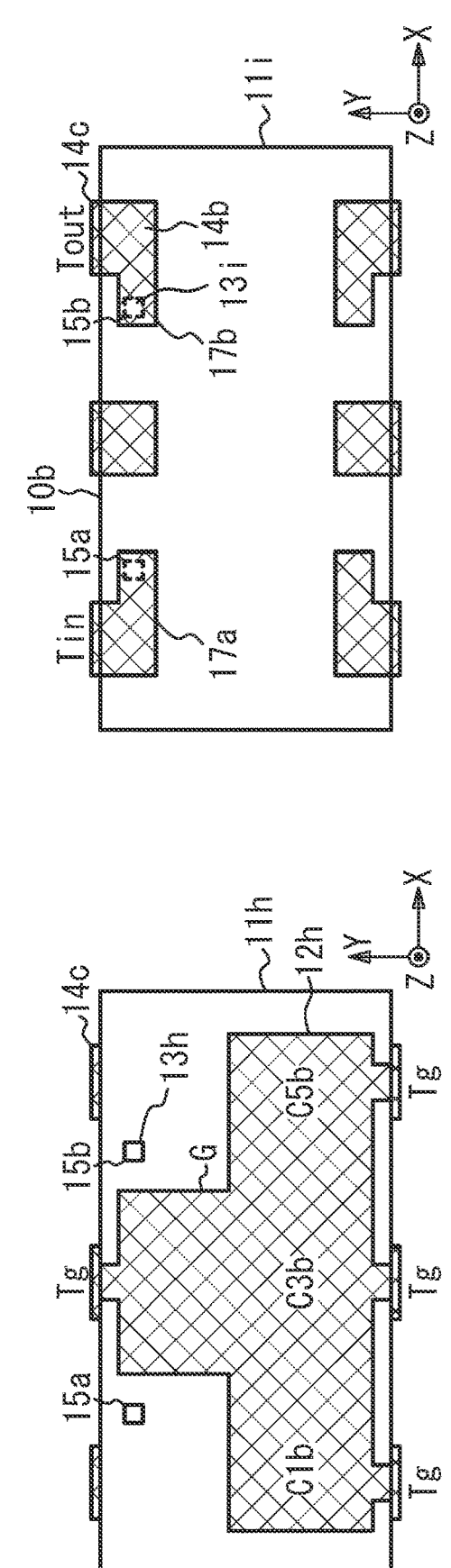

MULTILAYER ELECTRONIC COMPONENT

CROSS-REFERENCE TO RELATED APPLICATION

This application is based upon and claims the benefit of priority of the prior Japanese Patent Application No. 2021-157584, filed on Sep. 28, 2021, the entire contents of which are incorporated herein by reference.

FIELD

A certain aspect of the present embodiments relates to a multilayer electronic component and, more particularly, to a multilayer electronic component having a multilayer structure in which dielectric layers are stacked.

BACKGROUND

In wireless communication terminals such as smartphones and mobile phones, filters and multiplexers such as diplexers for removing unnecessary interfering waves are used. It is known to use a multilayer structure in which dielectric layers are stacked as a filter and a multiplexer. It is known to provide side-surface electrodes for electrically connecting to the outside on side surfaces of a multilayer structure as disclosed in, for example, International Publication No. 2018/142667 and Japanese Patent Application Laid-Open No. 2017-212717.

SUMMARY

In the multilayer electronic component having the side-surface electrodes, the inductor can be electrically connected to the side-surface electrodes by connecting the inductor to the side-surface electrodes on the surface of the dielectric layer on which the inductor is formed. The inductor can be inspected by inspecting electric continuity between the side-surface electrodes to which the inductor is connected. However, it is difficult to inspect the dielectric layers on which no inductor is provided.

An object of the present disclosure is to easily perform inspection.

According to an aspect of the present invention, there is provided a multilayer electronic component including: a multilayer structure in which dielectric layers are stacked in a stack direction, the multilayer structure having a first surface and a second surface provided on respective sides in the stack direction; a first side-surface electrode provided on a side surface of the multilayer structure; an inductor provided in the multilayer structure; a capacitor provided between the inductor and the first surface; a via wiring line that penetrates through dielectric layers from a first dielectric layer to a second dielectric layer, and electrically connects a first end of the inductor and the first side-surface electrode, the first dielectric layer being in contact with the inductor, the second dielectric layer being located closer to the first surface than at least a part of the capacitor; and a second side-surface electrode that is electrically connected to the first side-surface electrode through the inductor and the via wiring line and is provided on the side surface or another side surface of the multilayer structure.

BRIEF DESCRIPTION OF THE DRAWINGS

FIG. 3A to FIG. 3F are plan views illustrating respective dielectric layers in a multilayer structure of the multilayer electronic component in accordance with the first embodiment;

FIG. 4A to FIG. 4D are plan views illustrating respective dielectric layers in the multilayer structure of the multilayer electronic component in accordance with the first embodiment:

FIG. 10A to FIG. 10D are plan views illustrating respective dielectric layers in a multilayer structure of a multilayer electronic component in accordance with a third variation of the first embodiment;

FIG. 16A to FIG. 16D are plan views illustrating respective dielectric layers in a multilayer structure of a multilayer electronic component in accordance with the fifth variation of the first embodiment;

DETAILED DESCRIPTION

Hereinafter, embodiments of the present disclosure will be described with reference to the accompanying drawings.

First Embodiment

Figure 1:
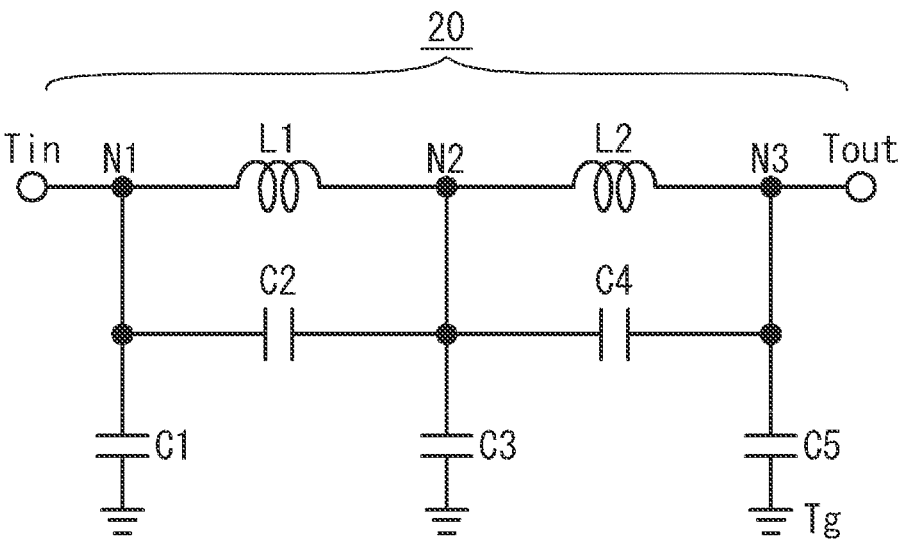
FIG. 1 is a circuit diagram of an LPF in a first embodiment.

As a first embodiment, a multilayer electronic component having a low-pass filter (LPF) will be described as an example. FIG. 1 is a circuit diagram of an LPF in accordance with the first embodiment. As illustrated in FIG. 1, an LPF 20 is connected between an input terminal Tin and an output terminal Tout. The LPF 20 transmits signals in the passband lower than the cutoff frequency to the output terminal Tout among high-frequency signals input to the input terminal Tin, and suppresses signals in frequency bands higher than the cutoff frequency. The LPF 20 includes inductors L1 and L2 and capacitors C1 to C5.

The inductors L1 and L2 are connected in series between the input terminal Tin and the output terminal Tout. Nodes N1 to N3 are provided in a path between the input terminal Tin and the output terminal Tout. The capacitor C1 is shunt-connected to the node N1 between the input terminal Tin and the inductor L1. The capacitor C3 is shunt-connected to the node N2 between the inductors L1 and L2. The capacitor C5 is shunt-connected to the node N3 between the inductor L2 and the output terminal Tout. First ends of the capacitors C1, C3, and C5 are coupled to the nodes N1 to N3, respectively, and second ends of the capacitors C1, C3, and C5 are coupled to ground terminals Tg. The capacitor C2 is connected in parallel to the inductor L1 between the nodes N1 and N2. The capacitor C4 is connected in parallel to the inductor L2 between the nodes N2 and N3. In the LPF 20, the input terminal Tin and the output terminal Tout are electrically connected to each other (i.e., connected in a direct-current (DC) manner).

Table 1 presents examples of the inductances of the inductors L1 and L2 and the capacitances of the capacitors C1 to C5.

TABLE 1

| L1 | L2 | C1 | C2 | C3 | C4 | C5 |
|---|---|---|---|---|---|---|
| 5 nH | 5 nH | 0.7 pF | 0.7 pF | 1.6 pF | 0.7 pF | 0.7 pF |

The number of inductors and capacitors and the element values (that is, inductance and capacitance) can be set as appropriate.

Figure 2A:
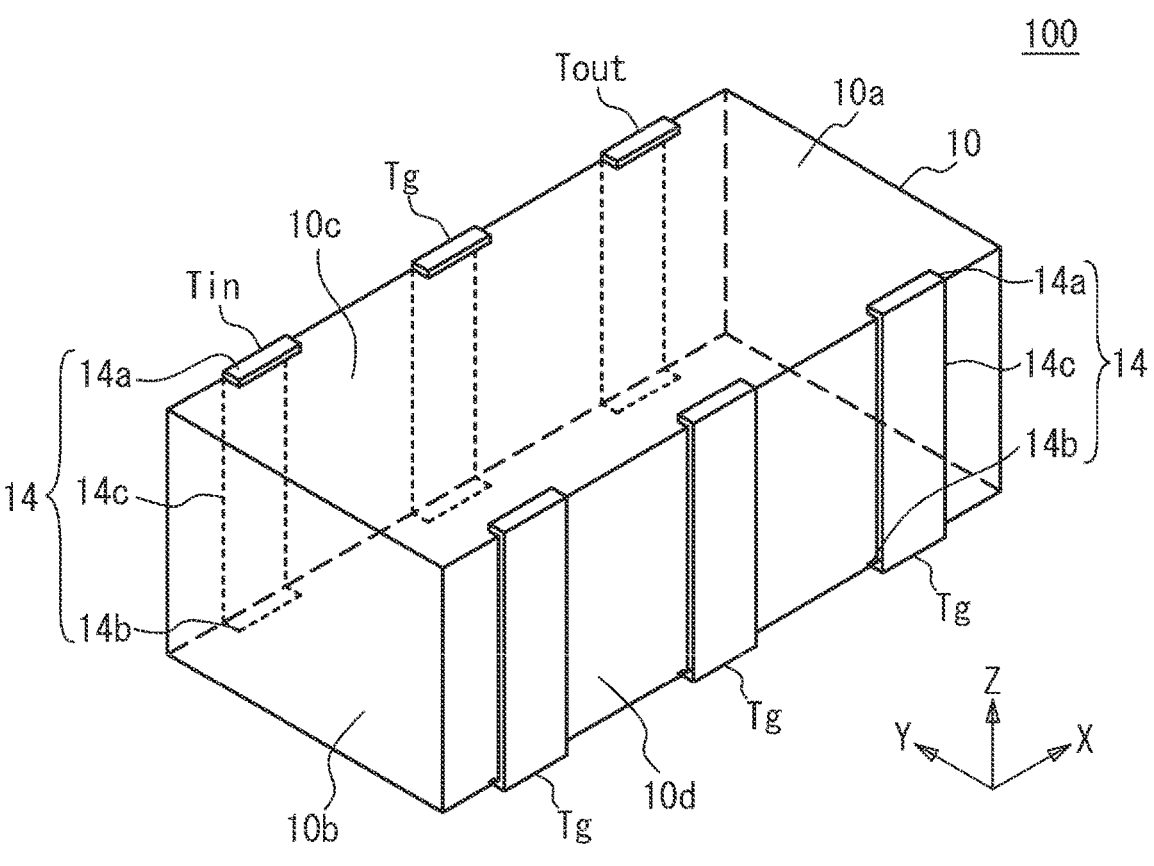
FIG. 2A and FIG. 2B are a perspective view and a cross-sectional view of a multilayer electronic component in accordance with a first embodiment, respectively.
Figure 2B:
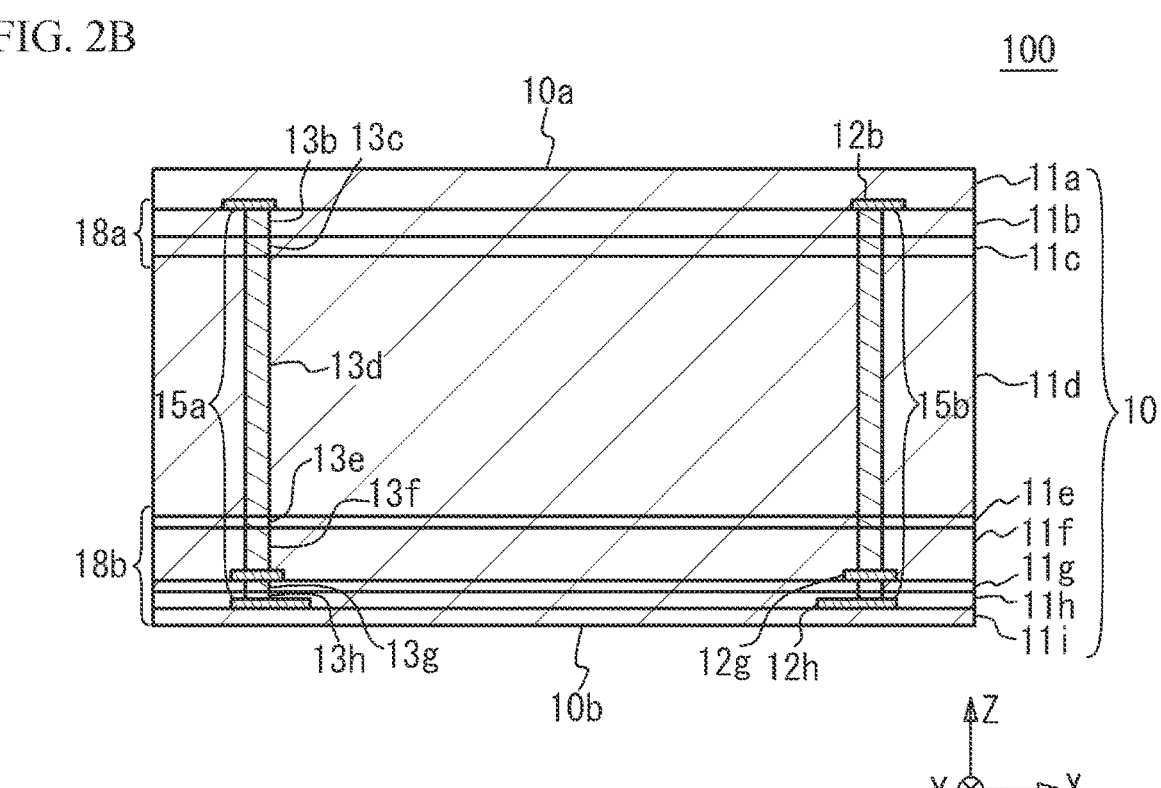

FIG. 2A and FIG. 2B are a perspective view and a cross-sectional view of the multilayer electronic component in accordance with the first embodiment, respectively. A stack direction of a multilayer structure 10 is defined as a Z direction, a length direction thereof is defined as an X direction, and a width direction thereof is defined as a Y direction. As illustrated in FIG. 2A, the surfaces of both sides in the Z direction of the multilayer structure 10 are an upper surface 10a (a surface at the +Z side) and a lower surface 10b (a surface at the −Z side). In a multilayer electronic component 100, the surfaces of both sides in the Y direction of the multilayer structure 10 are a side surface 10c (a surface at the +Y side) and a side surface 10d (a surface at the −Y side). External electrodes 14 are provided on the side surfaces 10c and 10d. The external electrode 14 is an electrode for electrically connecting to an external circuit or an external device. The external electrode 14 is bonded to an electrode of the external circuit or the external device by a conductive bonding member such as solder. The external electrodes 14 serve as the input terminal Tin, the output terminal Tout, and the ground terminal Tg. Each external electrode 14 includes an upper-surface electrode 14a provided on the upper surface 10a, a lower-surface electrode 14b provided on the lower surface 10b, and a side-surface electrode 14c provided on the side surface 10c or 10d. Each external electrode 14 may not necessarily include the upper-surface electrode 14a and the lower-surface electrode 14b, and may include only the side-surface electrodes 14c. By providing the side-surface electrodes 14c, when the multilayer electronic component 100 is mounted on a mounting substrate, it is possible to observe from above the bonding state between the external electrodes 14 and the mounting substrate by a bonding material such as solder.

As illustrated in FIG. 2B, the multilayer structure 10 includes a plurality of dielectric layers 11a to 11i stacked in the Z direction. Conductor patterns 12a to 12i are provided on the upper surfaces of the dielectric layers 11a to 11i, respectively. In FIG. 2B, conductor patterns 12b, 12g, and 12h are illustrated. Via wiring lines 13b to 13h penetrating through the dielectric layers 11b to 11h, respectively, are provided. Each of via wiring lines 15a and 15b includes the via wiring lines 13b to 13h connected in the Z direction. The section including the dielectric layers 11a to 11d is an inductor formation section 18a in which the inductors L1 and L2 are formed. The section including the dielectric layers 11e to 11i is a capacitor formation section 18b in which the capacitors C1 to C5 are formed. When the multilayer electronic component 100 is mounted on a mounting substrate, if the inductors L1 and L2 are close to the mounting substrate, eddy-current loss occurs in the inductors L1 and L2 because of the conductor patterns in the mounting substrate, and the Q factors decrease. Therefore, the inductor formation section 18a is provided at the upper surface 10a side of the multilayer structure 10, and the capacitor formation section 18b is provided between the inductor formation section 18a and the lower surface 10b of the multilayer structure 10. This structure increases the distance between the inductor L1 and the mounting substrate and the distance between the inductor L2 and the mounting substrate, and reduces a decrease in the Q factors of the inductors L1 and L2.

FIG. 3A to FIG. 4D are plan views illustrating respective dielectric layers in the multilayer structure of the multilayer electronic component in accordance with the first embodiment. FIG. 3A to FIG. 4C are plan views of the dielectric layers 11a to 11i, respectively. FIG. 4D is a plan view of the lower surface of the dielectric layer 11i as seen through from above. In FIG. 4C, the via wiring lines 13h are indicated by broken lines. FIG. 2B corresponds to a cross section taken along line A-A in FIG. 3A to FIG. 4D.

As illustrated in FIG. 3A, the conductor pattern 12a including a direction identification mark and the upper-surface electrodes 14a are provided on the upper surface 10a of the dielectric layer 11a. As illustrated in FIG. 3B, the conductor pattern 12b including patterns L1a and L2a is provided on the upper surface of the dielectric layer 11b. First ends of the patterns L1a and L2a are coupled to the via wiring lines 13b that are to be part of the via wiring lines 15a and 15b.

As illustrated in FIG. 3C, the conductor pattern 12c including patterns L1b and L2b is provided on the upper surface of the dielectric layer 11c. As illustrated in FIG. 3D, the conductor pattern 12d including patterns L1c and L2c is provided on the upper surface of the dielectric layer 11d. The patterns L1a to L1c are electrically connected by the via wiring lines 13b and 13c to form the inductor L1. The patterns L2a to L2c are electrically connected by the via wiring lines 13b and 13c to form the inductor L2.

As illustrated in FIG. 3E, the conductor pattern 12e including patterns C2a and C4a is provided on the upper surface of the dielectric layer 11e. As illustrated in FIG. 3F, the conductor pattern 12f including patterns C2b and C4b is provided on the upper surface of the dielectric layer 11f. The patterns C2a and C2b sandwiching the dielectric layer 11e therebetween form the capacitor C2. The patterns C4a and C4b sandwiching the dielectric layer 11e therebetween form the capacitor C4.

As illustrated in FIG. 4A, the conductor pattern 12g including patterns C1a, C3a, and C5a is provided on the upper surface of the dielectric layer 11g. As illustrated in FIG. 4B, the conductor pattern 12h including a pattern G is provided on the upper surface of the dielectric layer 11h. On the upper surface of the dielectric layer 11h, the pattern G is coupled to the side-surface electrodes 14c that form the ground terminals Tg. The pattern G includes patterns C1b, C3b, and C5b. The patterns C1a and C1b sandwiching the dielectric layer 11g therebetween form the capacitor C1. The patterns C3a and C3b sandwiching the dielectric layer 11g therebetween form the capacitor C3. The patterns C5a and C5b sandwiching the dielectric layer 11g therebetween form the capacitor C5.

As illustrated in FIG. 4C, the conductor pattern 12i including patterns 16a and 16b is provided on the upper surface of the dielectric layer 11i. On the upper surface of the dielectric layer 11i, the pattern 16a is connected to the side-surface electrode 14c that forms the input terminal Tin. Thus, the pattern 16a electrically connects the via wiring line 15a and the input terminal Tin. On the upper surface of the dielectric layer 11i, the pattern 16b is connected to the side-surface electrode 14c forming the output terminal Tout. As a result, the pattern 16b electrically connects the via wiring line 15b and the output terminal Tout. As illustrated in FIG. 4D, the lower-surface electrodes 14b are provided on the lower surface 10b of the dielectric layer 11i. As described above, a first end of the pattern L1a provided on the upper surface of the dielectric layer 11b is electrically connected to the input terminal Tin through the via wiring line 15a and the pattern 16a. A first end of the pattern L2a provided on the upper surface of the dielectric layer 11b is electrically connected to the output terminal Tout through the via wiring line 15b and the pattern 16b.

The dielectric layers 11a to 11i are made of a ceramic material and contain, for example, an oxide of silicon, calcium, and magnesium (for example, $CaMgSi_2O_6$, which is a diopside crystal) as a main component. The main components of the dielectric layers 11a to 11i may be oxides other than oxides of Si, Ca, and/or Mg. Furthermore, the dielectric layers 11a to 11i may contain an oxide of at least one of the following elements: Ti, Zr, and Al as an insulating material.

The conductor patterns 12a to 12i, the via wiring lines 13b to 13i, and the external electrodes 14 are non-magnetic metal layers containing, for example, Ag, Pd, Pt, Cu, Ni, Au, Au—Pd alloy, or Ag—Pt alloy as a main component. The external electrode 14 may contain a non-conductive material such as $TiO_2$, $ZrO_2$, or $Al_2O_3$ in addition to the above metal material.

The multilayer structure 10 is manufactured as follows, for example. The dielectric layers 11a to 11i are formed using, for example, a doctor-blade method. The via wiring lines 13b to 13i penetrating through the dielectric layers 11b to 11i are formed. For example, via holes penetrating through the dielectric layers 11a to 11i are formed by laser light irradiation. The via wiring lines 13b to 13i are formed in the via holes using a squeegee method or the like. The conductor patterns 12a to 12i are formed on the surfaces of the dielectric layers 11a to 11i. The conductor patterns 12a to 12i are formed using, for example, a screen printing method or a transfer method. The dielectric layers 11a to 11i are stacked to form the multilayer structure 10. For example, thermal pressurization or an adhesive is used to stack the dielectric layers 11a to 11i. The multilayer structure 10 is fired at, for example, 700° C. or higher. As a result, the dielectric layers 11a to 11i become a sintered body. The side-surface electrodes 14c are formed on the side surfaces of the multilayer structure 10.

Figure 5A:
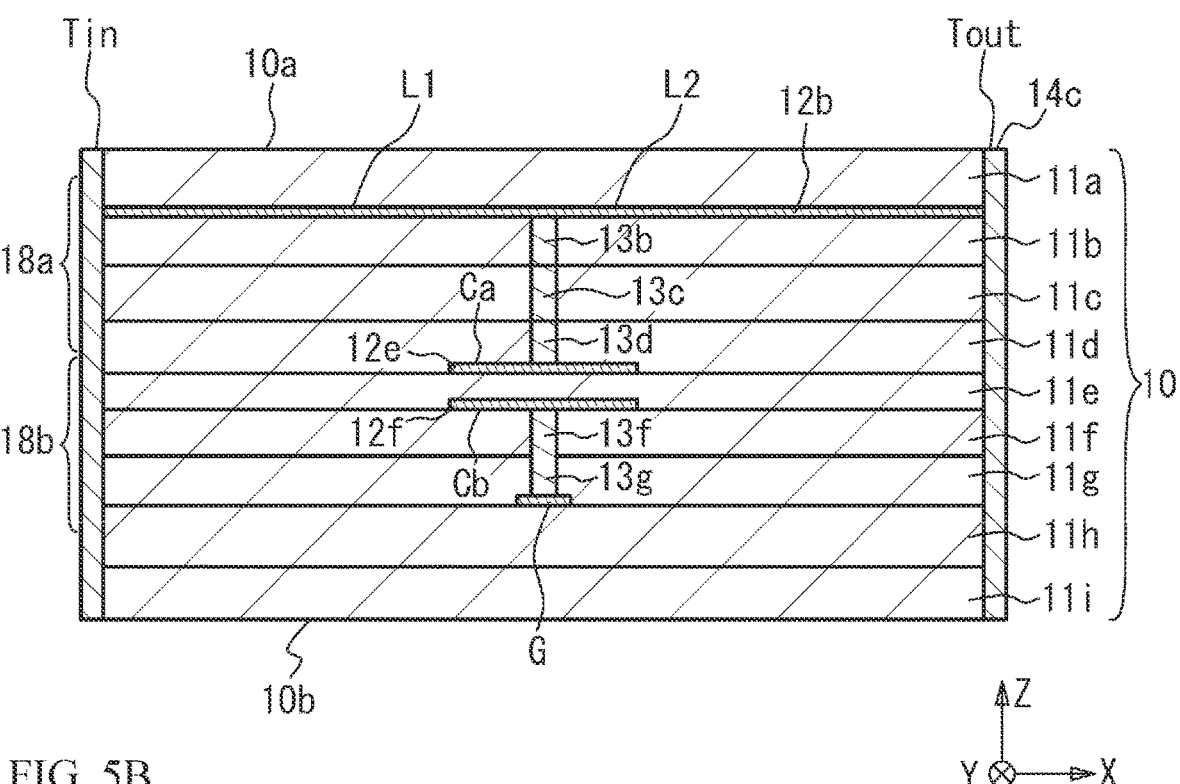
FIG. 5A and FIG. 5B are schematic cross-sectional views of a multilayer electronic component in accordance with a first comparative example.
Figure 5B:
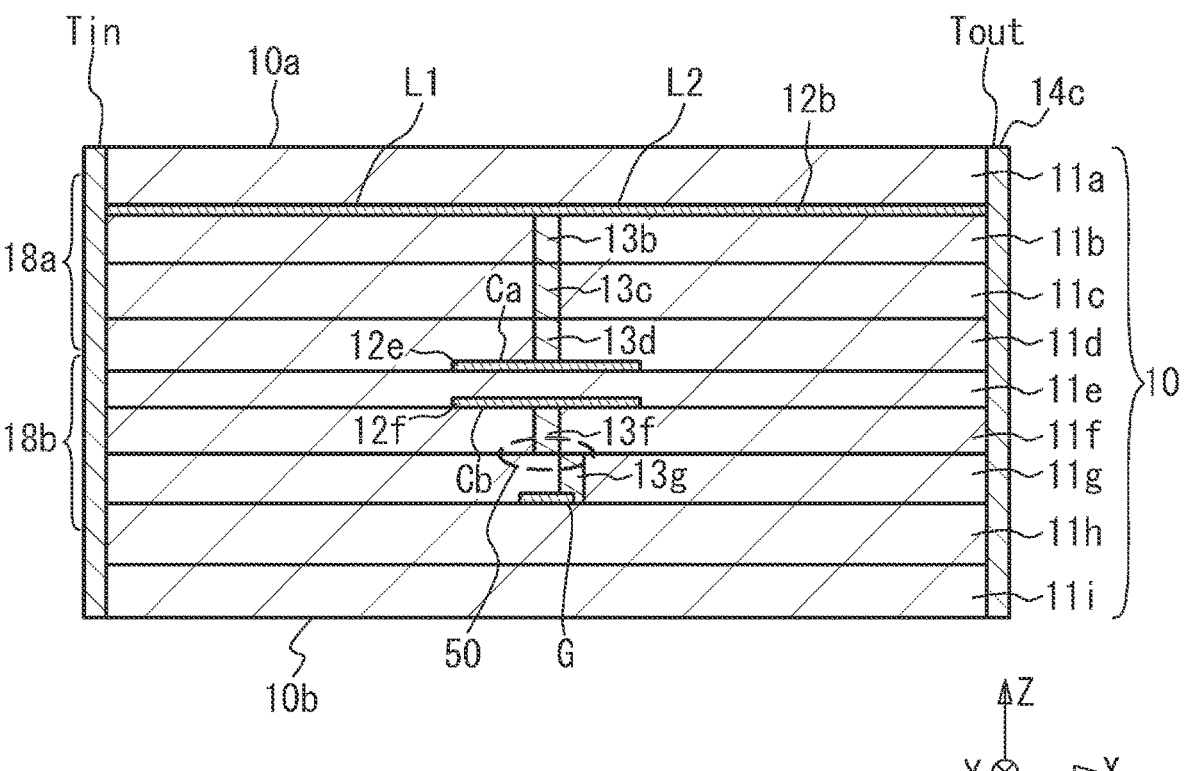

FIG. 5A and FIG. 5B are schematic cross-sectional views of a multilayer electronic component in accordance with a first comparative example. As illustrated in FIG. 5A, in the first comparative example, the inductors L1 and L2 are formed by the conductor pattern 12b in the inductor formation section 18a. A first end of the inductor L1 is coupled to the input terminal Tin in the inductor formation section 18a, and a first end of the inductor L2 is coupled to the output terminal Tout in the inductor formation section 18a. The capacitor C is formed by patterns Ca and Cb sandwiching the dielectric layer 11e therebetween in the capacitor formation section 18b. The pattern Ca is electrically connected to a second end of the inductor L1 and a second end of the inductor L2 through the via wiring lines 13b to 13d. The pattern Cb is electrically connected to the ground pattern G through the via wiring lines 13f to 13g. As a result, the inductors L1 and L2 are connected in series between the input terminal Tin and the output terminal Tout, and the capacitor C is shunt-connected.

As illustrated in FIG. 5B, when the multilayer structure 10 is formed, the positions of the dielectric layers 11a to 11i may shift. For example, the dielectric layer 11g is shifted in the +X direction. As a result, as indicated by a broken line 50, the positions of the via wiring lines 13f and 13g are shifted, and the via wiring lines 13f and 13g are disconnected. Or, the contact resistance between the via wiring lines 13f and 13g is increased. However, even when the electric continuity between the input terminal Tin and the output terminal Tout is inspected, it is impossible to inspect the positional deviation of the dielectric layers 11c to 11i below the inductor formation section 18a. Further, the continuity check between the input terminal Tin or the output terminal Tout and the ground terminal Tg cannot be performed because of the capacitor C.

Figure 6A:
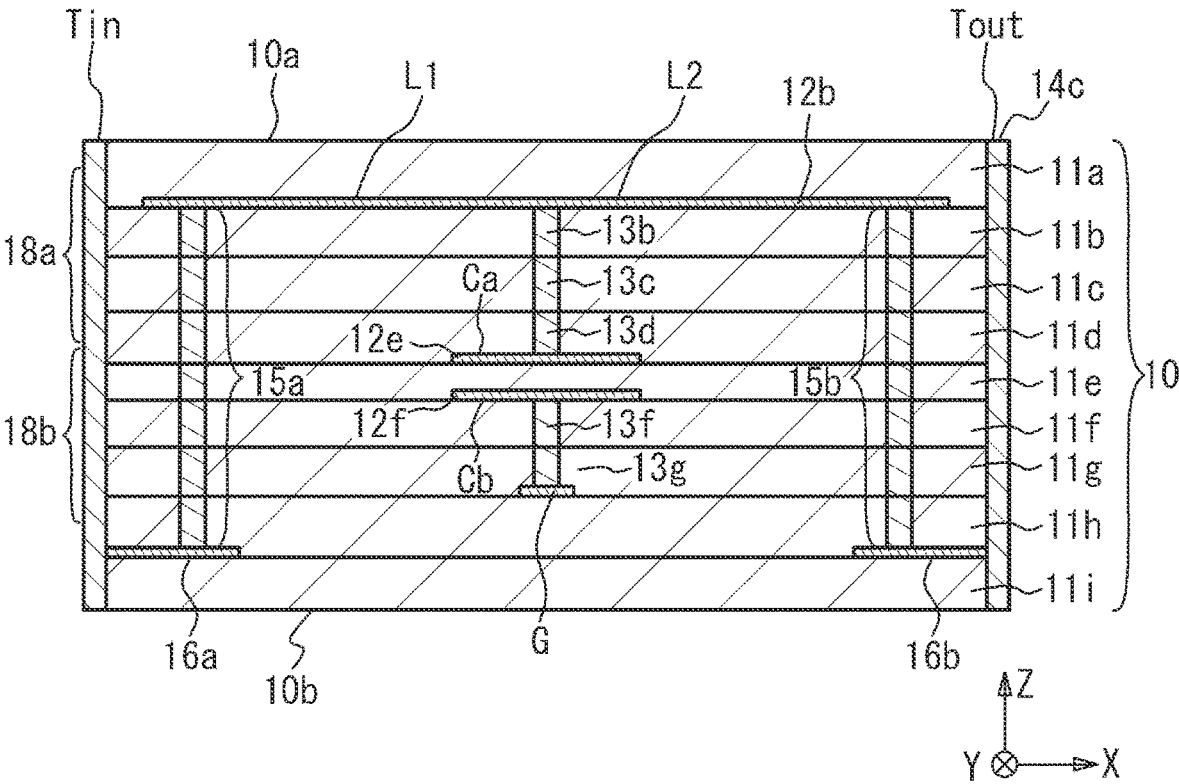
FIG. 6A and FIG. 6B are schematic cross-sectional views of the multilayer electronic component in accordance with the first embodiment.
Figure 6B:
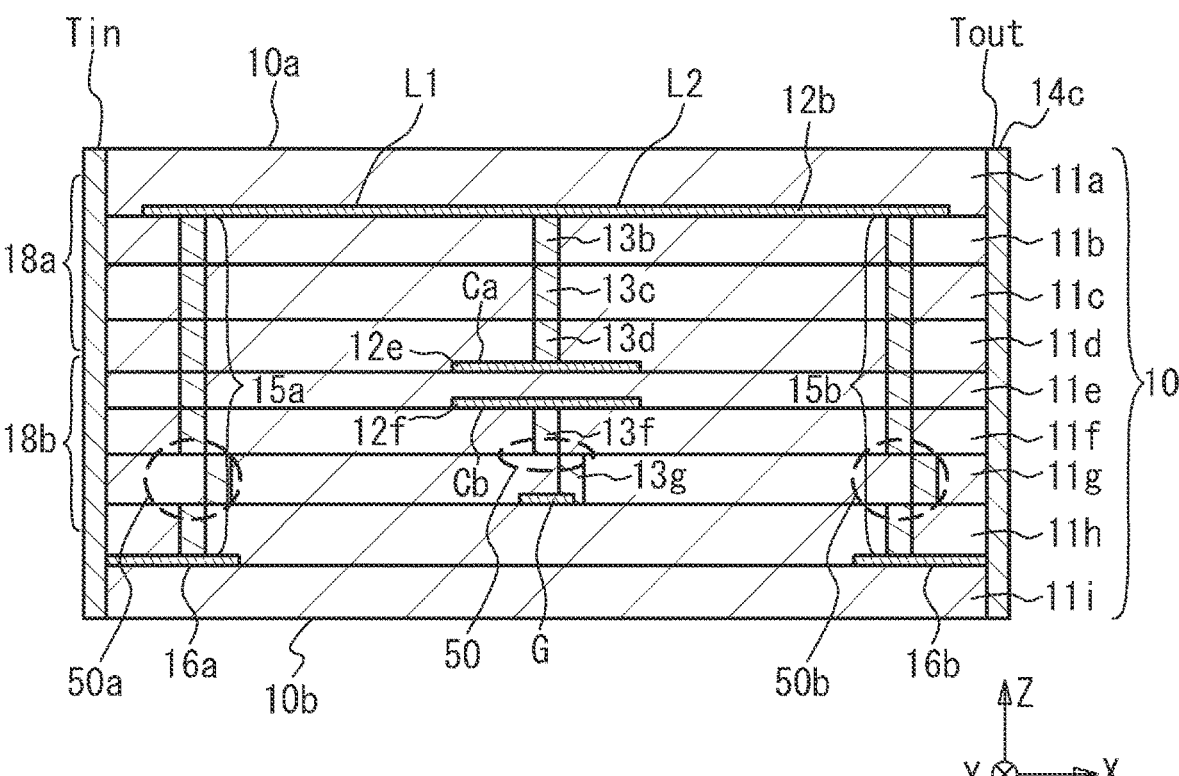

FIG. 6A and FIG. 6B are schematic cross-sectional views of the multilayer electronic component in accordance with the first embodiment. As illustrated in FIG. 6A, in the first embodiment, a first end of the inductor L1 is electrically connected to the input terminal Tin through the via wiring line 15a and the pattern 16a, and a first end of the inductor L2 is electrically connected to the output terminal Tout through the via wiring line 15b and the pattern 16b. As described above, the inductors L1 and L2 are not connected to the input terminal Tin or the output terminal Tout in the inductor formation section 18a. The inductors L1 and L2 are electrically connected to the input terminal Tin and the output terminal Tout through the patterns 16a and 16b that are located lower than the capacitor formation section 18b.

As illustrated in FIG. 6B, when the dielectric layer 11g is shifted in the +X direction, as indicated by broken lines 50a and 50b, the via wiring lines 13g forming the via wiring lines 15a and 15b are shifted in the +X direction. When the electric continuity between the input terminal Tin and the output terminal Tout is inspected, detected is disconnection or high resistance between the input terminal Tin and the output terminal Tout. Therefore, it is possible to inspect positional deviation of the dielectric layers 11b to 11h in the inductor formation section 18a and the capacitor formation section 18*b*. Further, defects in the via wiring lines 13*b* to 13*h* can be inspected. As the continuity check, the electric continuity between the input terminal Tin and the output terminal Tout may be checked using a direct current or an alternating current.

First Variation of the First Embodiment

Figure 7A:
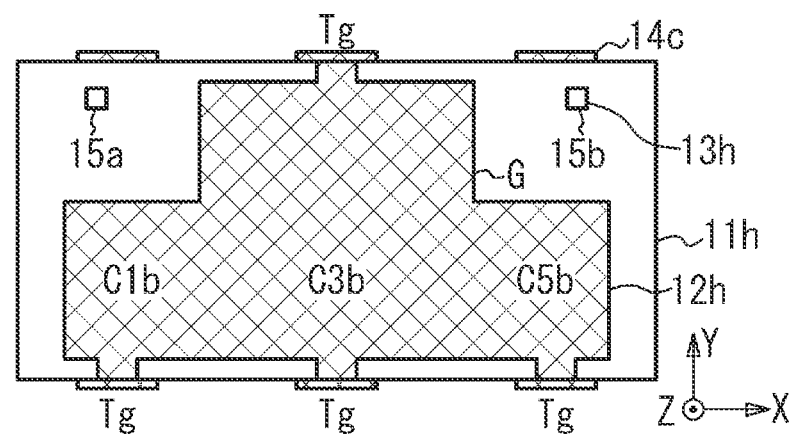
FIG. 7A to FIG. 7C are plan views illustrating respective dielectric layers in a multilayer structure of a multilayer electronic component in accordance with a first variation of the first embodiment.
Figure 7B:
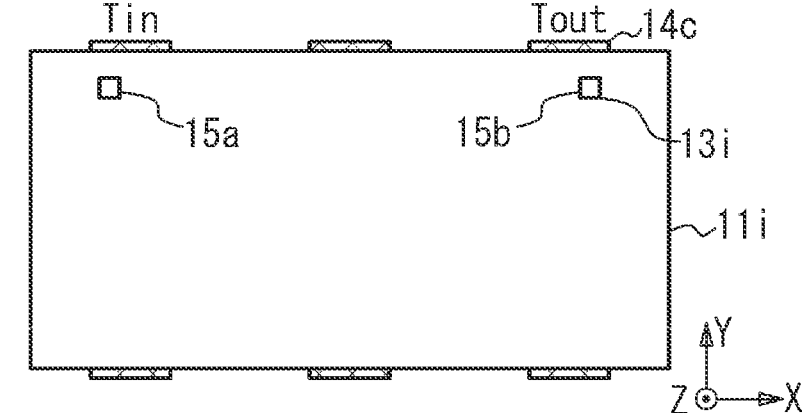
Figure 7C:
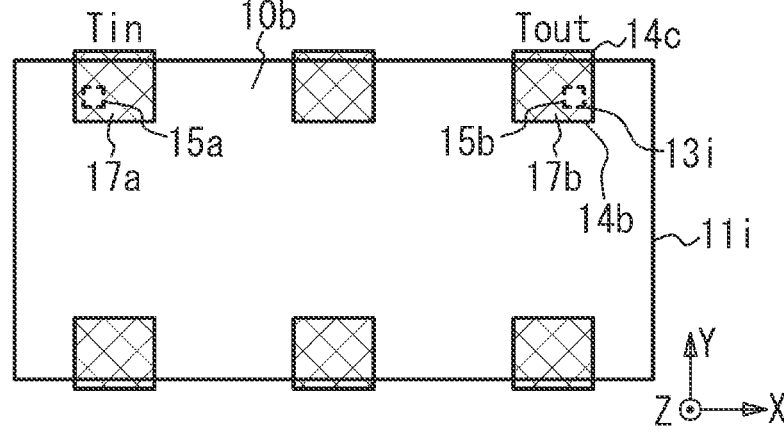

FIG. 7A to FIG. 7C are plan views illustrating dielectric layers in a multilayer structure of a multilayer electronic component in accordance with a first variation of the first embodiment. The dielectric layers 11*a* to 11*g* are the same as those in FIG. 3A to FIG. 4A of the first embodiment. FIG. 7A and FIG. 7B are plan views of the dielectric layers 11*h* and 11*i*, respectively. FIG. 7C is a plan view of the lower surface of the dielectric layer 11*i* as seen through from above. In FIG. 7C, the via wiring lines 13*i* are indicated by broken lines.

As illustrated in FIG. 7A, the configurations of the conductor pattern 12*h* on the dielectric layer 11*h* and the via wiring lines 13*h* are the same as those in FIG. 4B. As illustrated in FIG. 7B, the conductor pattern 12*i* is not provided on the dielectric layer 11*i*. The via wiring lines 13*i* penetrating through the dielectric layer 11*i* are provided. Each of the via wiring lines 15*a* and 15*b* is formed of the via wiring lines 13*b* to 13*i* that are connected.

As illustrated in FIG. 7C, the lower-surface electrodes 14*b* provided on the lower surface 10*b* of the dielectric layer 11*i* include patterns 17*a* and 17*b*. The via wiring line 15*a* is electrically connected to the input terminal Tin through the pattern 17*a*. The via wiring line 15*b* is electrically connected to the output terminal Tout through the pattern 17*b*. Other configurations are the same as those in the first embodiment, and a description thereof will be omitted. In the first variation of the first embodiment, the continuity check of the dielectric layer 11*i* can be performed in addition to the dielectric layers 11*b* to 11*h*.

Second Variation of the First Embodiment

Figure 8A:
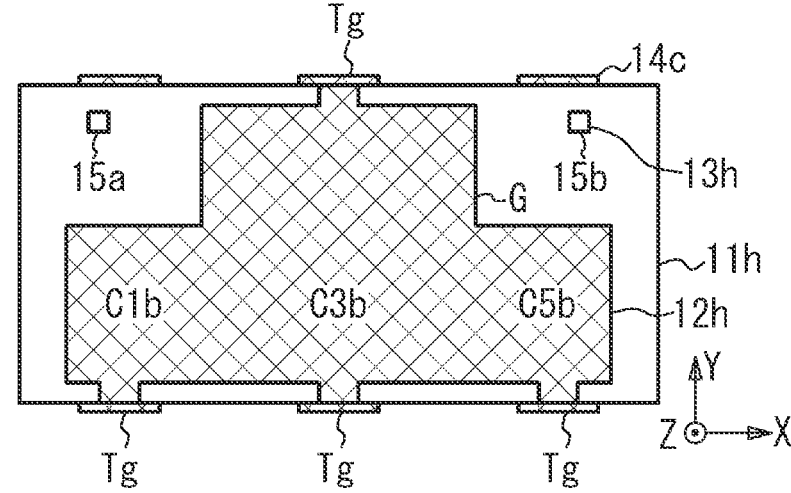
FIG. 8A to FIG. 8C are plan views illustrating respective dielectric lavers in a multilayer structure of a multilayer electronic component in accordance with a second variation of the first embodiment.
Figure 8B:
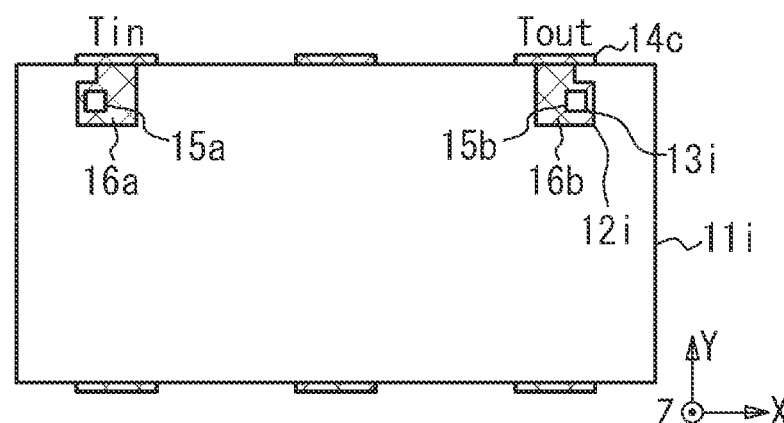
Figure 8C:
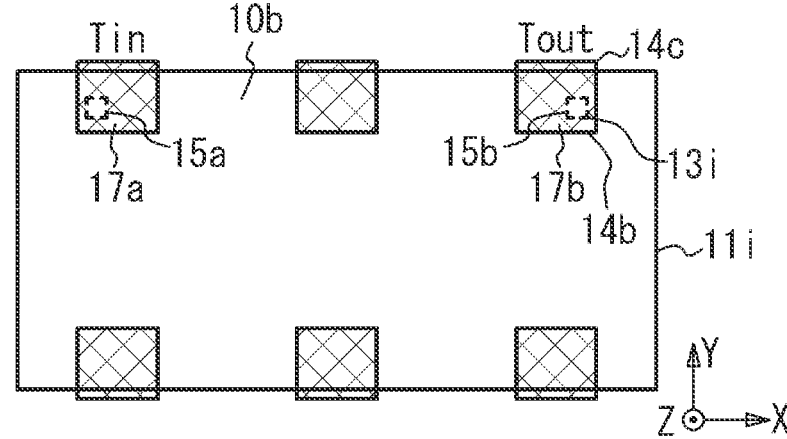

FIG. 8A to FIG. 8C are plan views illustrating respective dielectric layers in a multilayer structure of a multilayer electronic component in accordance with a second variation of the first embodiment. The dielectric layers 11*a* to 11*g* are the same as those in FIG. 3A to FIG. 4A of the first embodiment. FIG. 8A and FIG. 8B are plan views illustrating the dielectric layers 11*h* and 11*i*, respectively. FIG. 8C is a plan view of the lower surface of the dielectric layer 11*i* as seen through from above. In FIG. 8C, the via wiring lines 13*i* are indicated by broken lines.

As illustrated in FIG. 8A, the configurations of the conductor pattern 12*h* on the dielectric layer 11*h* and the via wiring lines 13*h* are the same as those in FIG. 4B. As illustrated in FIG. 8B, the conductor pattern 12*i* including the patterns 16*a* and 16*b* is provided on the dielectric layer 11*i*. The via wiring lines 15*a* and 15*b* are coupled to the patterns 16*a* and 16*b*, respectively. The patterns 16*a* and 16*b* are coupled to the input terminal Tin and the output terminal Tout, respectively.

As illustrated in FIG. 8C, the via wiring lines 15*a* and 15*b* are coupled to the patterns 17*a* and 17*b*, respectively. The patterns 17*a* and 17*b* are coupled to the input terminal Tin and the output terminal Tout, respectively. Other configurations are the same as those in the first embodiment, and a description thereof will be omitted. In the second variation of the first embodiment, the patterns 16*a* and 17*a* are connected in parallel between the via wiring line 15*a* and the input terminal Tin, and the patterns 16*b* and 17*b* are connected in parallel between the via wiring line 15*b* and the output terminal Tout. Thus, the parasitic inductance between the via wiring line 15*a* and the input terminal Tin can be reduced, and the parasitic inductance between the via wiring line 15*b* and the output terminal Tout can be reduced.

Third Variation of the First Embodiment

FIG. 9A to FIG. 10D are plan views illustrating respective dielectric layers in a multilayer structure of a multilayer electronic component in accordance with a third variation of the first embodiment. FIG. 9A to FIG. 10D are plan views of the dielectric layers 11*a* to 11*i*, respectively. FIG. 10D is a plan view of the lower surface of the dielectric layer 11*i* as seen through from above. In FIG. 10D, the via wiring lines 13*i* are indicated by broken lines.

Figures 9A, 9B, 9C, 9D, 9E, 9F:
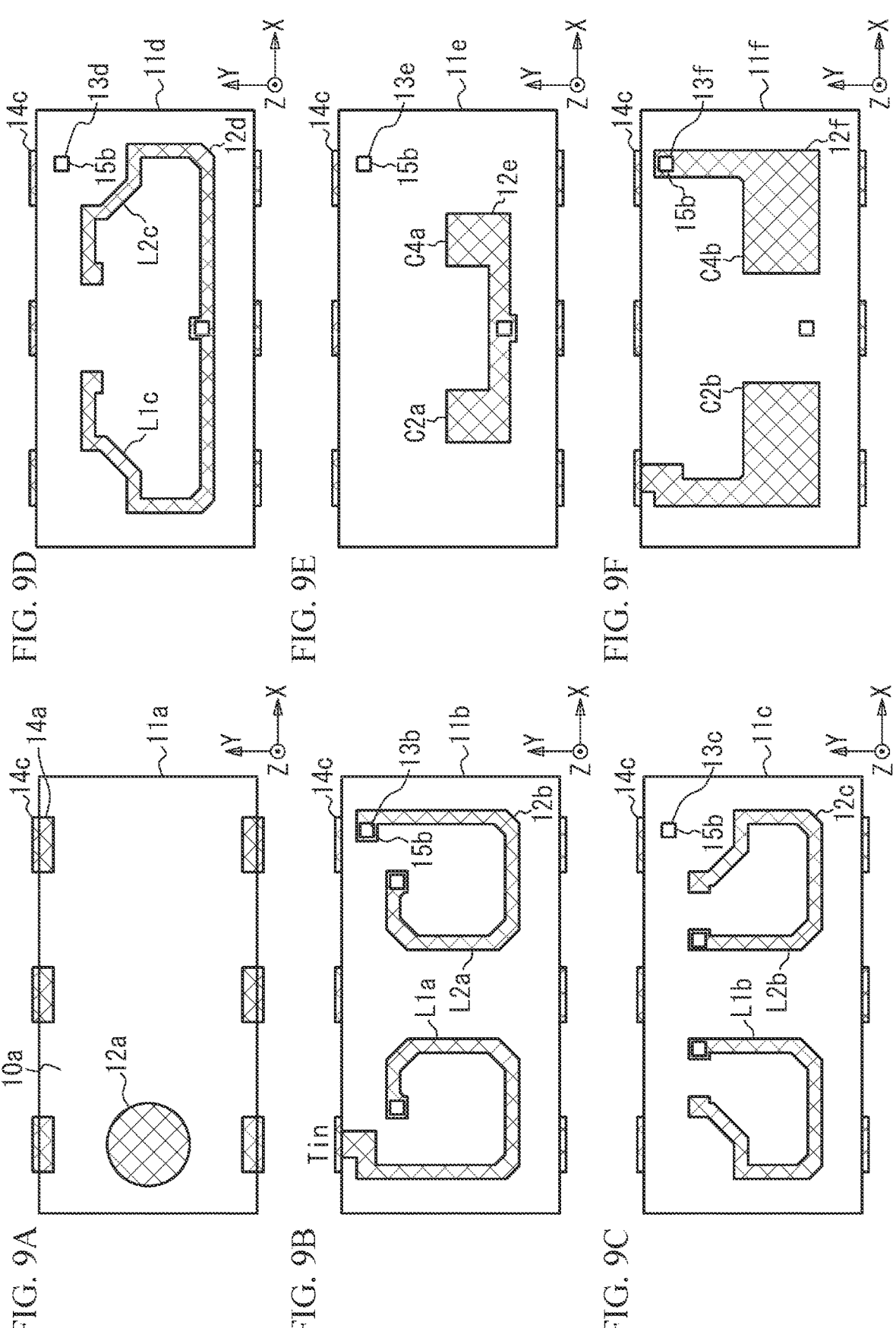
FIG. 9A to FIG. 9F are plan views illustrating respective dielectric layers in a multilayer structure of a multilayer electronic component in accordance with a third variation of the first embodiment.

As illustrated in FIG. 9A, the dielectric layer 11*a* is the same as that illustrated in FIG. 3A of the first embodiment. As illustrated in FIG. 9B, the via wiring line 15*a* is not provided, and a first end of the pattern L1*a* is coupled to the input terminal Tin. FIG. 9C to FIG. 9E are the same as FIG. 3C and FIG. 3E of the first embodiment, respectively, except that the via wiring line 15*a* is not provided. As illustrated in FIG. 9F, the via wiring line 15*a* is not provided, and the pattern C2*b* is coupled to the input terminal Tin on the upper surface of the dielectric layer 11*f*. As illustrated in FIG. 10A, the via wiring line 15*a* is not provided, and the pattern C1*a* is coupled to the input terminal Tin on the upper surface of the dielectric layer 11*g*. FIG. 10B and FIG. 10C are the same as FIG. 7B and FIG. 7C of the first variation of the first embodiment, respectively, except that the via wiring line 15*a* is not provided. As illustrated in FIG. 10D, the via wiring line 15*b* is coupled to the pattern 17*b*, and the pattern 17*b* is coupled to the output terminal Tout. Other configurations are the same as those in the first variation of the first embodiment, and a description thereof will be omitted. As in the third variation of the first embodiment, one of the via wiring lines 15*a* and 15*b* may be omitted.

Fourth Variation of the First Embodiment

Figure 11A:
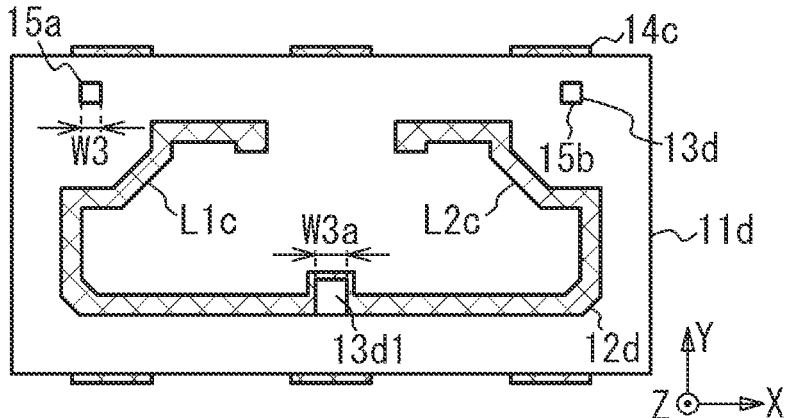
FIG. 11A to FIG. 11C are plan views illustrating respective dielectric layers in a multilayer structure of a multilayer electronic component in accordance with a fourth variation of the first embodiment.
Figure 11B:
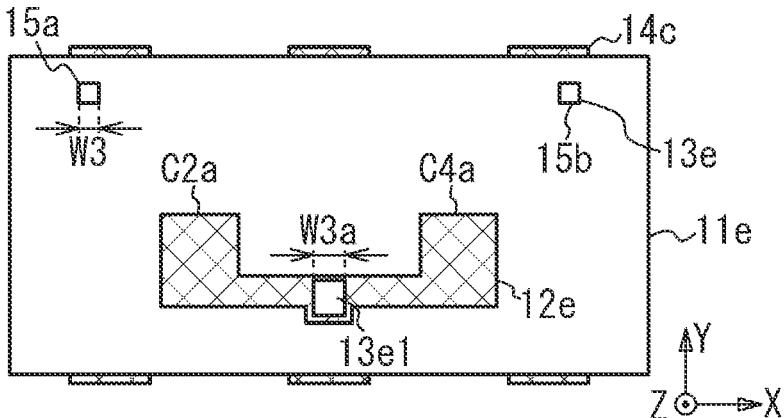
Figure 11C:
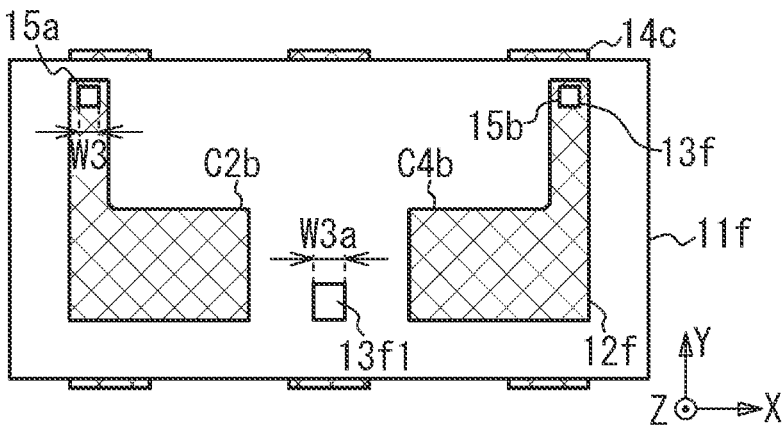

FIG. 11A to FIG. 11C are plan views illustrating respective dielectric layers in a multilayer structure of a multilayer electronic component in accordance with a fourth variation of the first embodiment. FIG. 11A to FIG. 11C are plan views of the dielectric layers 11*d* to 11*f*, respectively. The dielectric layers 11*a* to 11*c* and 11*g* to 11*i* are the same as those in the first embodiment or the first variation of the first embodiment.

As illustrated in FIG. 11A, the width W3*a* of a via wiring line 13*d*1 electrically connected between the patterns L1*c* and L2*c* is larger than the widths W3 of the via wiring lines 13*d* in the via wirings 15*a* and 15*b*. As illustrated in FIG. 11B, the width W3*a* of a via wiring 13*e*1 provided between the patterns C2*a* and C4*a* is larger than the widths W3 of the via wiring lines 13*e* in the via wiring lines 15*a* and 15*b*. As illustrated in FIG. 11C, the width W3*a* of a via wiring line 13*f*1 coupled to the via wiring line 13*e*1 is larger than the widths W3 of the via wiring lines 13*f* in the via wiring lines 15*a* and 15*b*. Other configurations are the same as those in the first embodiment or the first variation of the first embodiment, and a description thereof will be omitted.

It is possible to detect misalignment of the dielectric layers 11*b* to 11*i* by inspecting the electric continuity between the input terminal Tin and the output terminal Tout. In addition, it is possible to inspect the electric continuity failure of the via wiring lines 15a and 15b due to a cause other than misalignment. However, it is difficult to inspect the electric continuity failure due to a cause other than misalignment in the via wiring lines 13d1 to 13f1 other than the via wiring lines 15a and 15b. Therefore, the widths W3a of the via wiring lines 13d1 to 13f1 other than the via wiring lines 15a and 15b are adjusted to be larger than the widths W3 of the via wiring lines 15a and 15b. This configuration causes the via wiring lines 13d1 to 13f1 to be less likely to be disconnected or to be less likely to have high resistance. Therefore, even when it is not possible to inspect the electric continuity failure due to a cause other than misalignment in the via wiring lines 13d1 to 13f1, it is possible to inhibit the via wiring lines 13d1 to 13f1 from being defective.

In the first embodiment and the first to fourth variations thereof, the side-surface electrode 14c (a second side-surface electrode) corresponding to the input terminal Tin and the side-surface electrode 14c (a first side-surface electrode) corresponding to the output terminal Tout are provided on the side surface 10c of the multilayer structure 10. The inductors L1 and L2 are provided in the multilayer structure 10. The capacitors C1 to C5 are provided between the inductors L1 and L2 and the lower surface 10b (a first surface). The via wiring line 15b penetrates through the dielectric layers 11b to 11h (or 11i) between the dielectric layers 11b and 11h (or 11i), and electrically connects a first end of the inductor L2 and the output terminal Tout. Here, the dielectric layer 11b (a first dielectric layer) is in contact with the inductors L1 and L2. The dielectric layer 11h (or 11i) (a second dielectric layer) is located closer to the lower surface 10b than at least a part of each of the capacitors C1 to C5. The input terminal Tin and the output terminal Tout are electrically connected to each other through the inductor L2 and the via wiring lines 15b. Thus, as illustrated in FIG. 6B, by inspecting the electric continuity between the input terminal Tin and the output terminal Tout, it is possible to inspect defects in the dielectric layers 11b to 11h.

The inductor L2 is not electrically connected to the terminal Tout at the positions closer to the upper surface 10a (a second surface) than the positions of the capacitors C1 to C5. Thus, by inspecting the electric continuity between the input terminal Tin and the output terminal Tout, it is possible to inspect defects of the dielectric layers 11b to 11h.

As in the first embodiment and the first variation thereof, another via wiring line 15a penetrates through the dielectric layers 11b to 11h (or 11b to 11i) and electrically connects a second end of the inductor L1 to the input terminal Tin. This structure allows defects of the dielectric layers 11b to 11h to be inspected accurately because the electric continuity in the via wiring lines 15a and 15b can be inspected, as compared with the case in which the via wiring line 15a is not provided as in the second variation of the first embodiment.

As illustrated in FIG. 11A to FIG. 11C of the fourth variation of the first embodiment, the planar areas of the via wiring lines 13d1 to 13f1 penetrating through the dielectric layer 11d to 11f (at least one dielectric layer of the dielectric layers 11a to 11i) other than the via wiring lines 15a and 15b electrically connected between the input terminal Tin and the output terminal Tout are larger than the planar areas of the via wiring lines 15a and 15b. This configuration inhibits defects of the via wiring lines 13d1 to 13f of which the electric continuity failure due to a cause other than misalignment of the dielectric layers 11b to 11h cannot be inspected. The planar areas of the via wiring lines 13d1 to 13f1 are preferably equal to or greater than 1.5 times, more preferably equal to or greater than 2 times the planar areas of the via wiring lines 15a and 15b.

As illustrated in FIG. 4C of the first embodiment, the pattern 16b, which is provided between the adjacent dielectric layers 11h and 11i between at least a part of each of the capacitors C1 to C5 and the lower surface 10b and electrically connects the via wiring line 15b and the output terminal Tout, is provided. This structure allows the via wiring line 15b and the output terminal Tout to be electrically connected. The lower-surface electrodes 14b may be omitted as in the first variation of the first embodiment.

As illustrated in FIG. 7C of the first variation of the first embodiment, the lower-surface electrodes 14b are provided on the lower surface 10b and are connected to the respective side-surface electrodes 14c. The via wiring 15b is connected to the pattern 17b of the lower-surface electrode 14b. This structure allows the via wiring line 15b to be electrically connected to the output terminal Tout.

First ends of the capacitors C1, C3, and C5 are connected to a path between the input terminal Tin and the output terminal Tout, and second ends of the capacitors C1, C3, and C5 are connected to the ground terminals Tg (ground electrodes) provided on the surface of the multilayer structure 10. By shunt-connecting the capacitors C1, C3, and C5, the LPF 20 including the inductors L1 and L2 and the capacitors C1 to C5 can be formed.

The first embodiment and the variations thereof have described a case in which the first side-surface electrode and the second side-surface electrode are the output terminal Tout and the input terminal Tin as an example, but the side-surface electrode may be a terminal other than the output terminal Tout and the input terminal Tin. Although an example in which the first side-surface electrode and the second side-surface electrode are provided on the same side surface 10c has been described, the first side-surface electrode may be provided on the side surface 10c, and the second side-surface electrode may be provided on the side surface 10d. The cutoff frequency of the LPF 20 is, for example, 0.5 GHz to 5 GHz. Although an example in which the multilayer electronic component includes the LPF 20 has been described, the multilayer electronic component may be other than a low pass filter. Further, the multilayer electronic component may include a filter other than the low-pass filter.

Simulation

Figure 12:
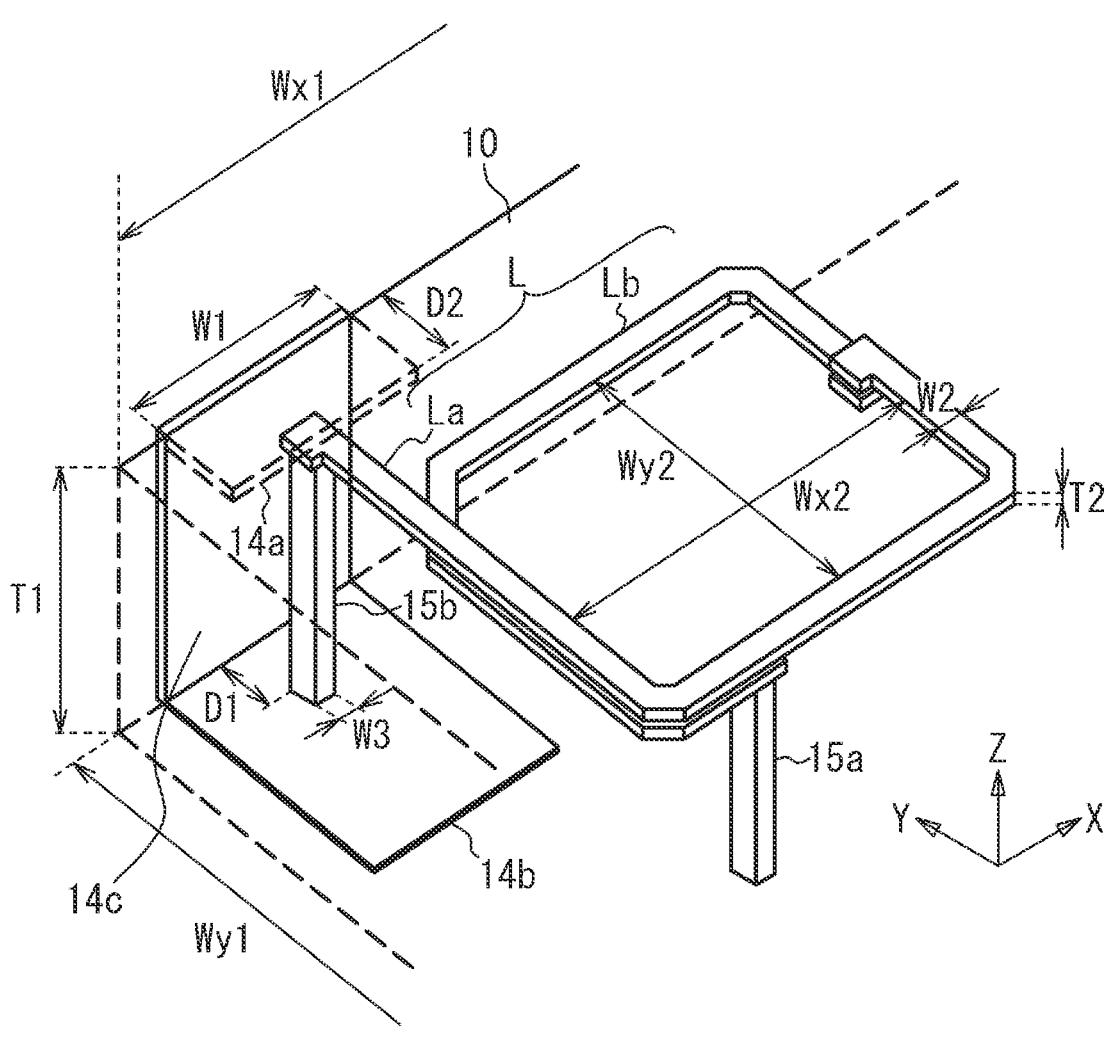
FIG. 12 is a perspective view of a simulated structure.
Figure 13A:
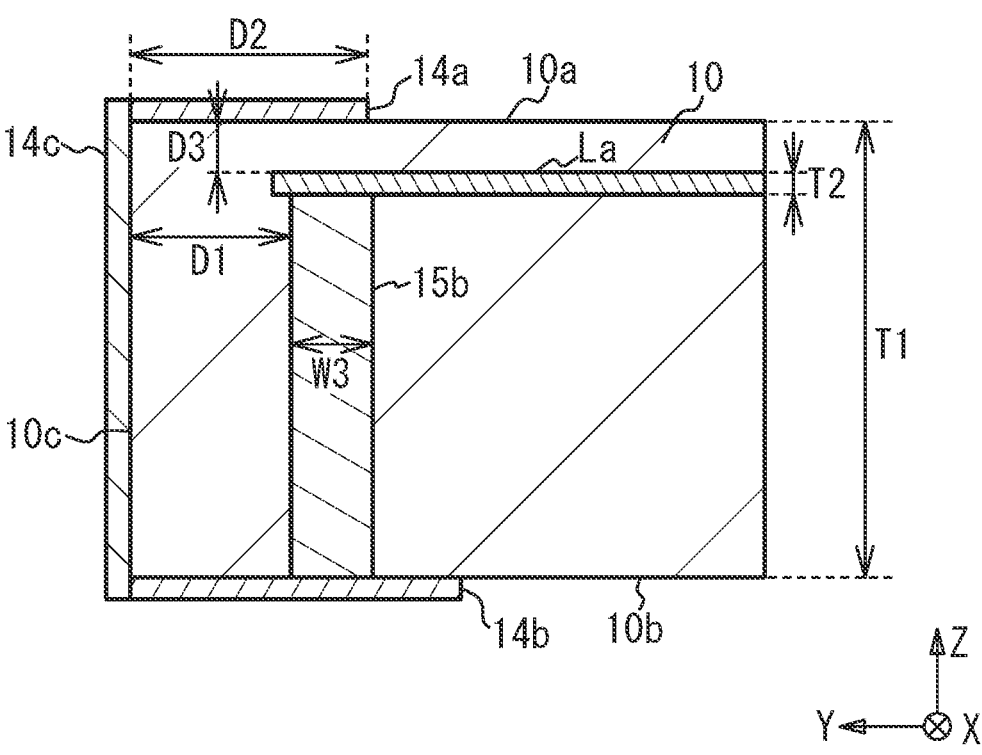
FIG. 13A is a side view of the vicinity of a via wiring line 15*b*.
Figure 13B:
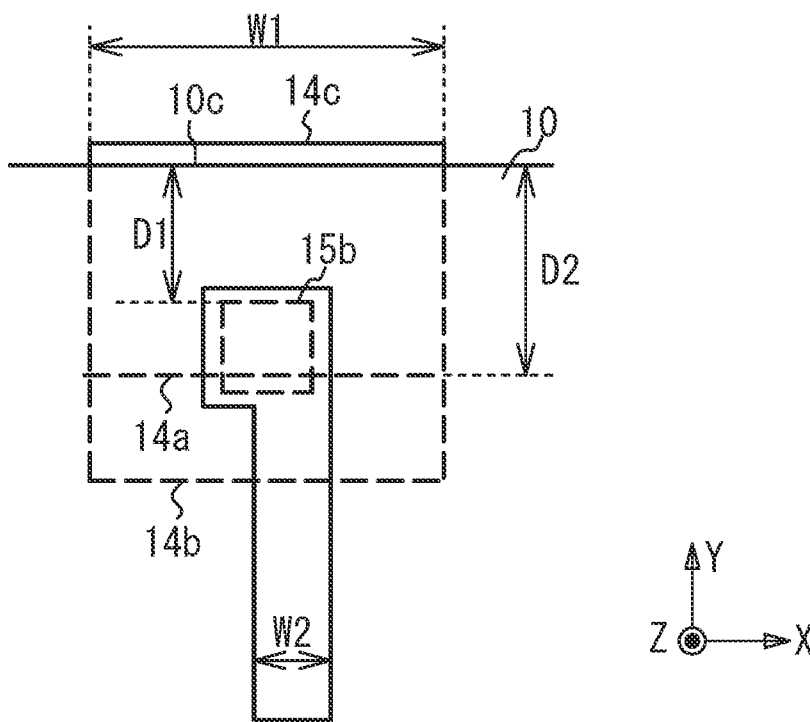
FIG. 13B is a plan view of the vicinity of the via wiring line 15*b;*

The Q factor of the inductor was simulated by electromagnetic field analysis. FIG. 12 is a perspective view of the simulated structure. FIG. 13A is a side view of the vicinity of the via wiring line 15b, and FIG. 13B is a plan view of the vicinity of the via wiring line 15b. As illustrated in FIG. 12 to FIG. 13B, an inductor L1 composed of patterns La and Lb is provided in the multilayer structure 10. The external electrode 14 is provided from the upper surface 10a to the lower surface 10b through the side surface 10c of the multilayer structure 10. The external electrode 14 includes the upper-surface electrode 14a provided on the upper surface 10a, the lower-surface electrode 14b provided on the lower surface 10b, and the side-surface electrode 14c provided on the side surface 10c. A first end of the inductor L is electrically connected to the lower-surface electrode 14b through the via wiring line 15b. A second end of the inductor L is connected to the via wiring line 15a.

The simulation conditions are as follows.

Multilayer Structure 10
    Width Wx1: 2.5 mm
    Width Wy1: 2.0 mm
    Thickness T1: 0.6 mm
    Relative permittivity: 10
Inductor L
    Internal diameter Wx2: 700 μm Internal diameter Wy2: 600 μm
Width W2: 60 μm
Thickness T2: 10 μm
Frequency at which Q factors were simulated: 3.3 GHz
Width W1 of the external electrode 14: 40 μm
Width of the via wiring line 15b: 50 μm The center of the side-surface electrode 14c in the X direction and the center of the via wiring line 15b in the X direction substantially coincide with each other. The distance between the side surface 10c and the via wiring line 15b is represented by D1, the width of the upper-surface electrode 14a in the Y direction is represented by D2, and the distance between the upper surface 10a and the inductor L is represented by D3.

Figure 14A:
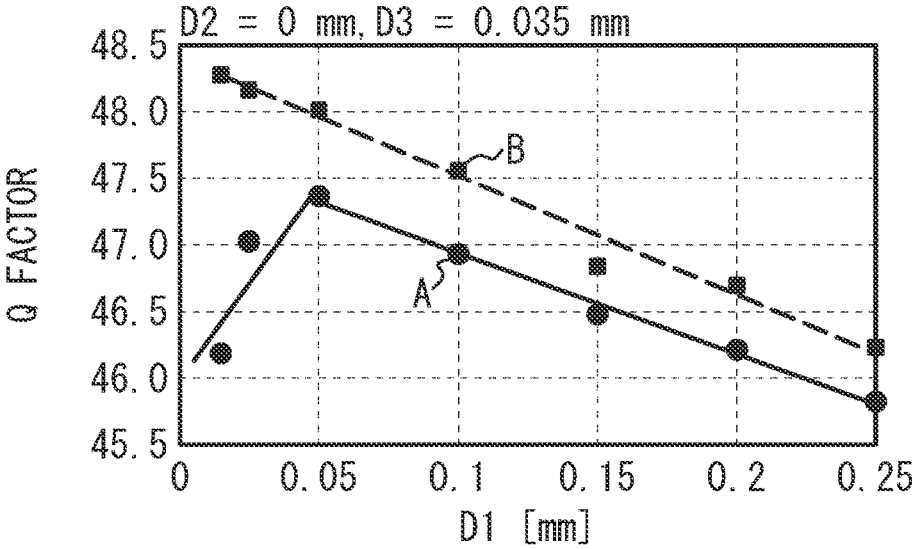
FIG. 14A to FIG. 14C are graphs presenting the Q factor of an inductor with respect to D1 to D3 in the simulation.
Figure 14B:
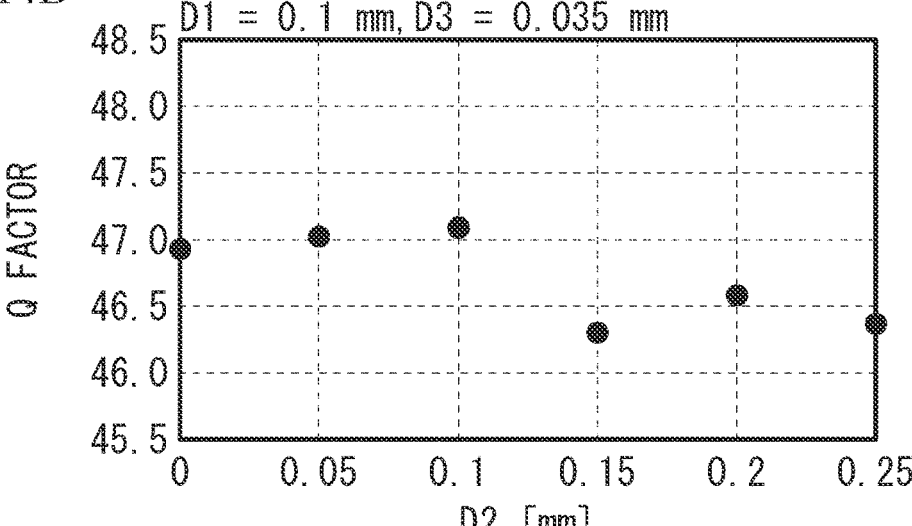
Figure 14C:
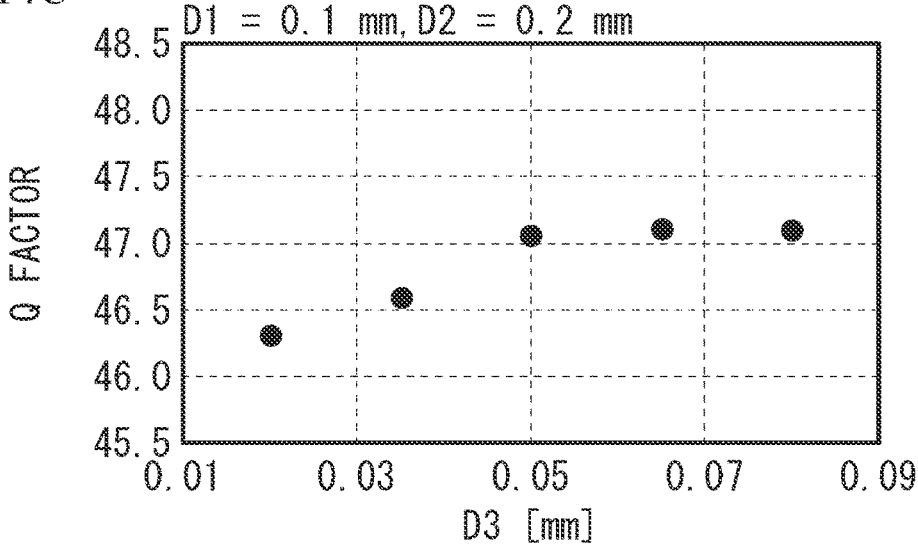

FIG. 14A to FIG. 14C are graphs presenting the Q factor of the inductor with respect to D1 to D3 in the simulation. Dots are simulated values. The straight line in FIG. 14A is an approximate straight line of the dots. In FIG. 14A, the Q factor of the inductor L was simulated while D2 was fixed to 0 mm (that is, no upper-surface electrode 14a is provided), D3 was fixed to 0.035 mm, and D1 was varied. A sample A is a sample in which the side-surface electrode 14c is provided on the side surface 10c, and a sample B is a sample in which the side-surface electrode 14c is not provided on the side surface 10c and the lower-surface electrode 14b is provided only on the lower surface 10b. In the sample B, as D1 becomes shorter, the Q factor improves. This is because when D1 is shortened, the distance between the via wiring line 15b and the spirally winding portion of the inductor L becomes longer. In the sample A, in the range where D1 is 0.05 mm or greater, the Q factor improves as D1 becomes shorter. This is the same as the sample B. In the range where D1 is 0.05 mm or less, the Q factor decreases as D1 becomes shorter. This is considered because the via wiring line 15b becomes closer to the side-surface electrode 14c. Thus, the distance D1 between the via wiring line 15b and the side-surface electrode 14c is preferably 50 μm or greater. In consideration of manufacturing errors, D1 is more preferably 75 μm or greater, and further preferably 100 μm or greater.

In FIG. 14B, the Q factor of the inductor L was simulated while D1 was fixed to 0.1 mm, D3 was fixed to 0.035 mm. D2 was varied. In the range where D2 is 0.1 mm or less, the Q factor is almost constant. In the range where D2 is 0.1 mm or greater, the Q factor decreases, and the variation in the Q factor increases. In the range D2 is 0.1 mm or greater, the upper-surface electrode 14a overlaps the inductor L and the via wiring line 15b in a plan view. This is considered the reason why the Q factor decreased. It is preferable that the upper-surface electrode 14a do not overlap the inductor L or the via wiring line 15b in a plan view.

In FIG. 14C, the Q factor of the inductor L was simulated while D1 was fixed to 0.1 mm, D2 was fixed to 0.2 mm, and D3 was varied. In the range where D3 is 0.05 mm or greater, the Q factor is almost constant. In the range where D3 is 0.05 mm or less, the Q factor decreases as D3 becomes shorter. This is because the inductor L becomes closer to the upper-surface electrode 14a.

As described above, it is preferable that the upper-surface electrode 14a do not overlap the inductor L or the via wiring line 15b in a plan view. In the case that the upper-surface electrode 14a overlaps the inductor L and the via wiring line 15b, the distance D3 between the inductor L and the upper-surface electrode 14a is preferably adjusted to be 50 μm or greater. In consideration of manufacturing errors, D3 is more preferably 75 μm or greater, and further preferably 100 μm or greater.

Fifth Variation of the First Embodiment

FIG. 15A to FIG. 16D are plan views illustrating respective dielectric layers in a multilayer structure of a multilayer electronic component in accordance with a fifth variation of the first embodiment. FIG. 15A to FIG. 16C are plan views of the dielectric layers 11a to 11i, respectively. FIG. 16D is a plan view of the lower surface of the dielectric layer 11i as seen through from above. In FIG. 16D, the via wiring lines 13i are indicated by broken lines.

Figures 15A, 15B, 15C, 15D, 15E, 15F:
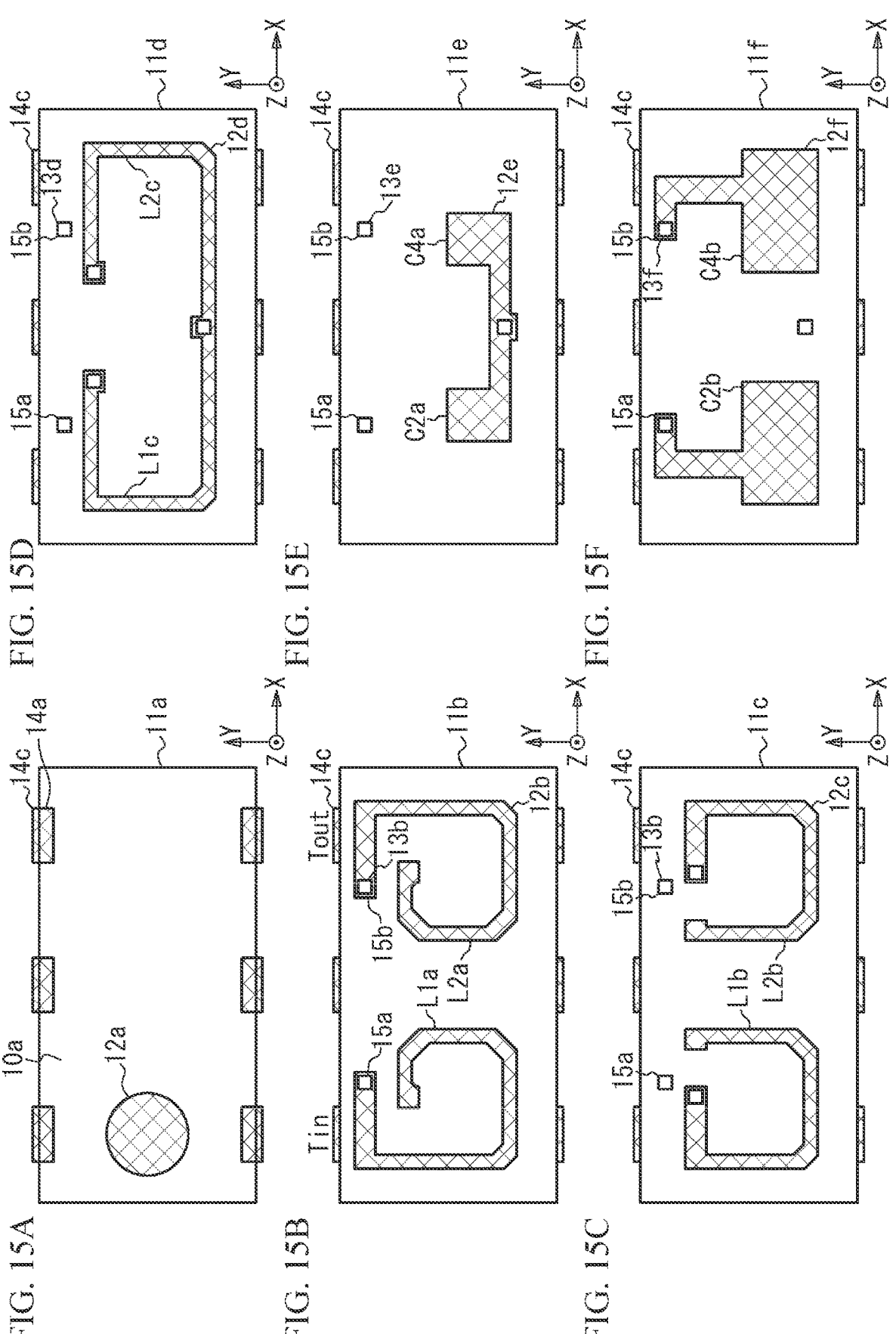
FIG. 15A to FIG. 15F are plan views illustrating respective dielectric layers in a multilayer structure of a multilayer electronic component in accordance with a fifth variation of the first embodiment.

As illustrated in FIG. 15A, the dielectric layer 11a is the same as that illustrated in FIG. 3A of the first embodiment. As illustrated in FIG. 15B, the via wiring line 15a is provided between the input terminal Tin and the ground terminal Tg in the X direction, and the via wiring line 15b is provided between the output terminal Tout and the ground terminal Tg in the X direction. Other configurations are the same as those in FIG. 3B. In FIG. 15C to FIG. 16B, the shapes of the conductor patterns 12c to 12h are different from those in FIG. 3C to FIG. 4B according to the positions of the via wiring lines 15a and 15b. As illustrated in FIG. 16C, the positions of the via wiring lines 15a and 15b are different from those in FIG. 7B. As illustrated in FIG. 16D, the pattern 17a extends to the +X side more than the input terminal Tin and is coupled to the via wiring line 15a. The pattern 17b extends to the −X side more than the output terminal Tout and is coupled to the via wiring line 15b. Other configurations are the same as those in the first variation of the first embodiment, and a description thereof will be omitted.

As in the simulation, the longer distances D3 between the via wiring lines 15a and 15b and the input terminal Tin and the output terminal Tout improve the Q factor of the inductor. However, as D3 increases, the size of the multilayer electronic component increases. Therefore, in the fifth variation of the first embodiment, the via wiring lines 15a and 15b do not overlap the input terminal Tin or the output terminal Tout as viewed in the Y direction (the thickness direction of the side-surface electrode). This configuration allows the distance D4 between the via wiring line 15a and the input terminal Tin and the distance D4 between the via wiring line 15b and the output terminal Tout to be, for example, 50 μm or greater even when the distance D3 between each of the via wiring lines 15a and 15b and the side surface 10c is short, as illustrated in FIG. 16C. Therefore, it is possible to reduce the size of the multilayer electronic component and to improve the Q factors of the inductors L1 and L2. As the via wiring lines 15a and 15b are closer to the ground terminals Tg, the Q factor decreases because of eddy-current loss. The decrease in the Q factor caused by the via wiring lines 15a and 15b close to the ground terminals Tg is larger than the decrease in the Q factor caused by the via wiring lines 15a and 15b close to the input terminal Tin and the output terminal Tout. Therefore, the distance D4 is preferably shorter than the distances D5 between the ground terminals Tg and the via wiring lines 15a and 15b. The distance D4 is preferably equal to or less than ½ of the distance D5.

Sixth Variation of the First Embodiment

Figure 17A:
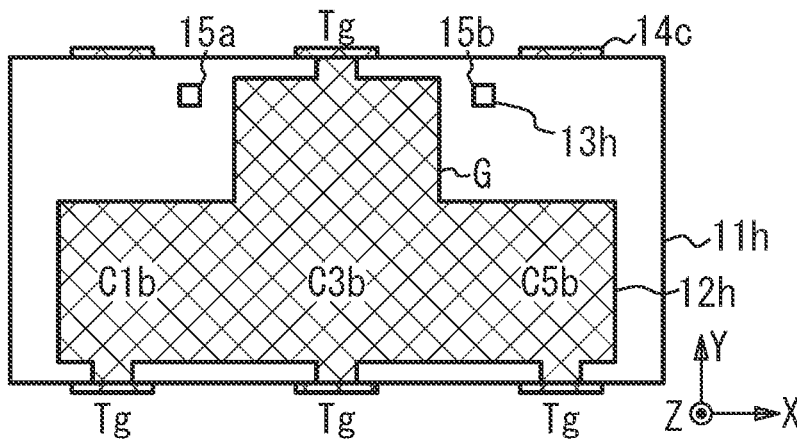
FIG. 17A to FIG. 17C are plan views illustrating respective dielectric layers in a multilayer structure of a multilayer electronic component in accordance with a sixth variation of the first embodiment.
Figure 17B:
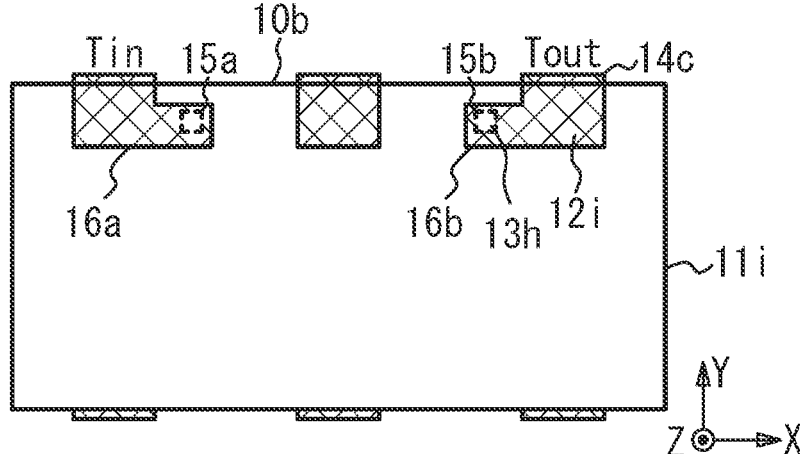
Figure 17C:
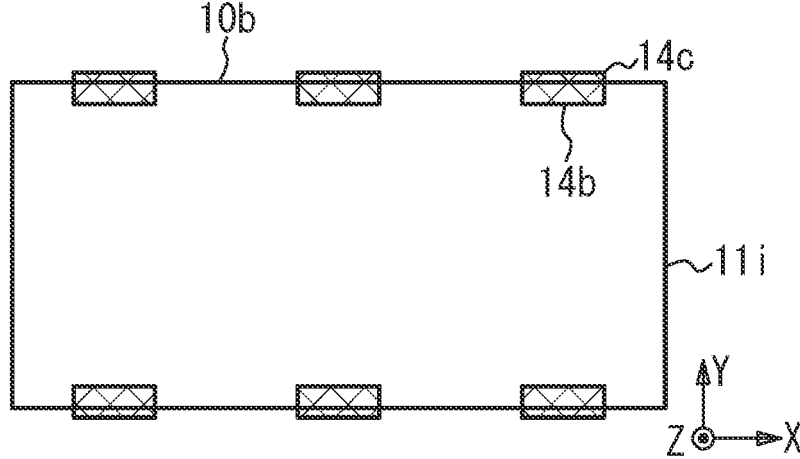

FIG. 17A to FIG. 17C are plan views illustrating respective dielectric layers in a multilayer structure of a multilayer electronic component in accordance with a sixth variation of the first embodiment. The dielectric layers 11a to 11g are the same as those in FIG. 15A to FIG. 16A of the fifth variation of the first embodiment. FIG. 17A and FIG. 17B are plan views of the dielectric layers 11*h* and 11*i*, respectively. FIG. 17C is a plan view of the lower surface of the dielectric layer 11*i* as seen through from above. In FIG. 17B, the via wiring lines 13*h* are indicated by broken lines.

As illustrated in FIG. 17A, the configurations of the conductor pattern 12*h* on the dielectric layer 11*h* and the via wiring lines 13*h* are the same as those in FIG. 16B. As illustrated in FIG. 17B, the conductor pattern 12*i* including the patterns 16*a* and 16*b* is provided on the dielectric layer 11*i*. The pattern 16*a* extends to the +X side more than the input terminal Tin and is coupled to the via wiring line 15*a*. The pattern 16*b* extends to the −X side more than the output terminal Tout and is coupled to the via wiring line 15*b*. As illustrated in FIG. 17C, the via wiring line 13*i* penetrating through the dielectric layer 11*i* is not provided. Other configurations are the same as those of the fifth variation of the first embodiment, and a description thereof will be omitted. As in the sixth variation of the first embodiment, the via wiring lines 15*a* and 15*b* may be not necessarily provided in the dielectric layer 11*i*.

Seventh Variation of the First Embodiment

Figure 18A:
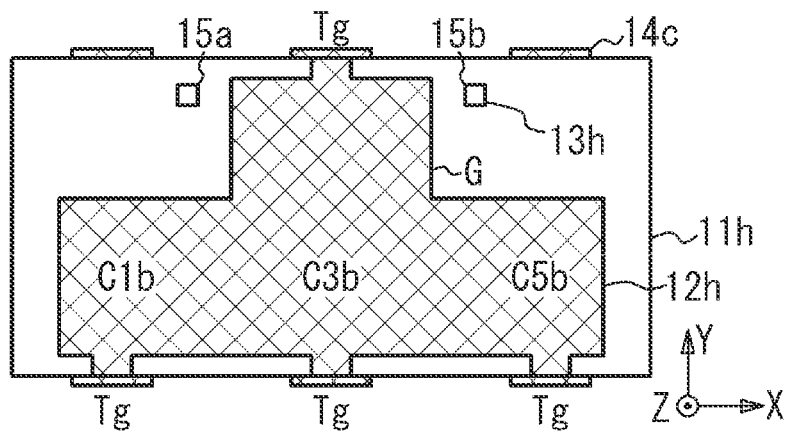
FIG. 18A to FIG. 18C are plan views illustrating respective dielectric layers in a multilayer structure of a multilayer electronic component in accordance with a seventh variation of the first embodiment.
Figure 18B:
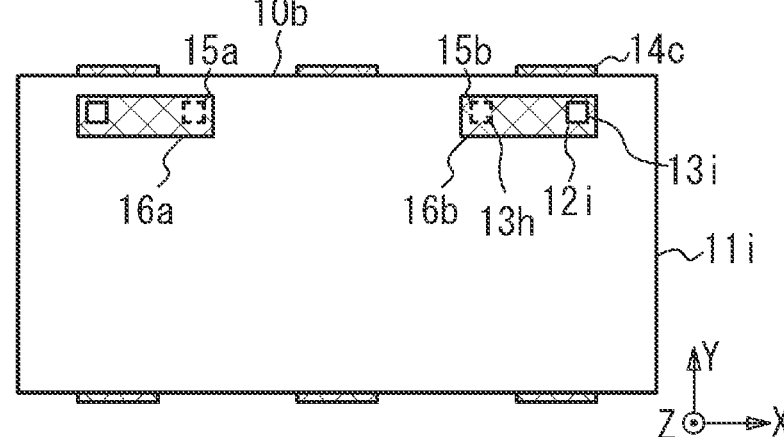
Figure 18C:
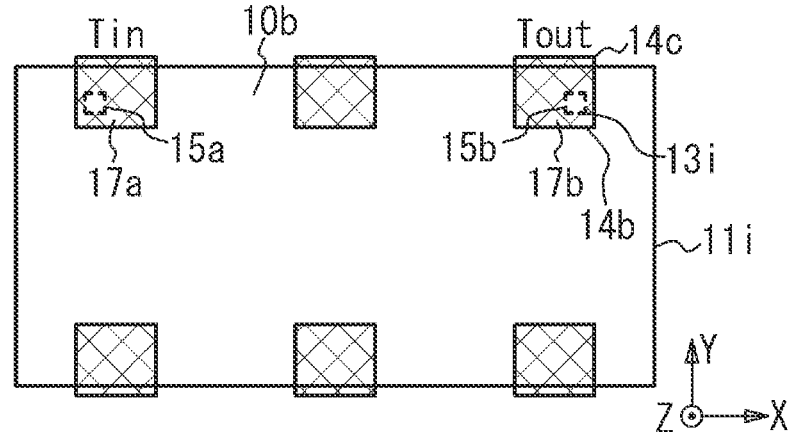

FIG. 18A to FIG. 18C are plan views illustrating respective dielectric layers in a multilayer structure of a multilayer electronic component in accordance with to a seventh variation of the first embodiment. The dielectric layers 11*a* to 11*g* are the same as those in FIG. 15A to FIG. 16A of the fifth variation of the first embodiment. FIG. 18A and FIG. 18B are plan views of the dielectric layers 11*h* and 11*i*, respectively. FIG. 18C is a plan view of the lower surface of the dielectric layer 11*i* as seen through from above. In FIG. 18B and FIG. 18C, the via wiring line 13*h* and the via wiring line 13*i* are indicated by broken lines.

As illustrated in FIG. 18A, the configurations of the conductor pattern 12*h* on the dielectric layer 11*h* and the via wiring lines 13*h* are the same as those in FIG. 16B. As illustrated in FIG. 18B, as viewed from the Y direction, the via wiring lines 13*h* are provided so as not to overlap the input terminal Tin or the output terminal Tout, and the via wiring lines 13*i* are provided so as to overlap the input terminal Tin and the output terminal Tout, respectively. The patterns 16*a* and 16*b* are not coupled to the input terminal Tin or the output terminal Tout, and electrically connect the via wiring lines 13*h* and 13*i*. As illustrated in FIG. 18C, the configurations of the lower-surface electrodes 14*b* and the via wiring lines 13*i* are the same as those in FIG. 7C of the first variation of the first embodiment. Other configurations are the same as those in the sixth variation of the first embodiment, and a description thereof will be omitted. As in the seventh variation of the first embodiment, in the via wiring lines 15*a* (and 15*b*), the via wiring lines 13*h* and 13*i* may have different planar positions, and the patterns 16*a* (and 16*b*) may electrically connect the via wiring lines 13*h* and 13*i*. As in the seventh variation of the first embodiment, it is only required that at least a part of each of the via wiring lines 15*a* and 15*b* does not overlap with the input terminal Tin or the output terminal Tout as viewed from the Y direction. This configuration can reduce the size of the multilayer electronic component and improve the Q factors of the inductors L1 and L2.

Second Embodiment

Figure 19:
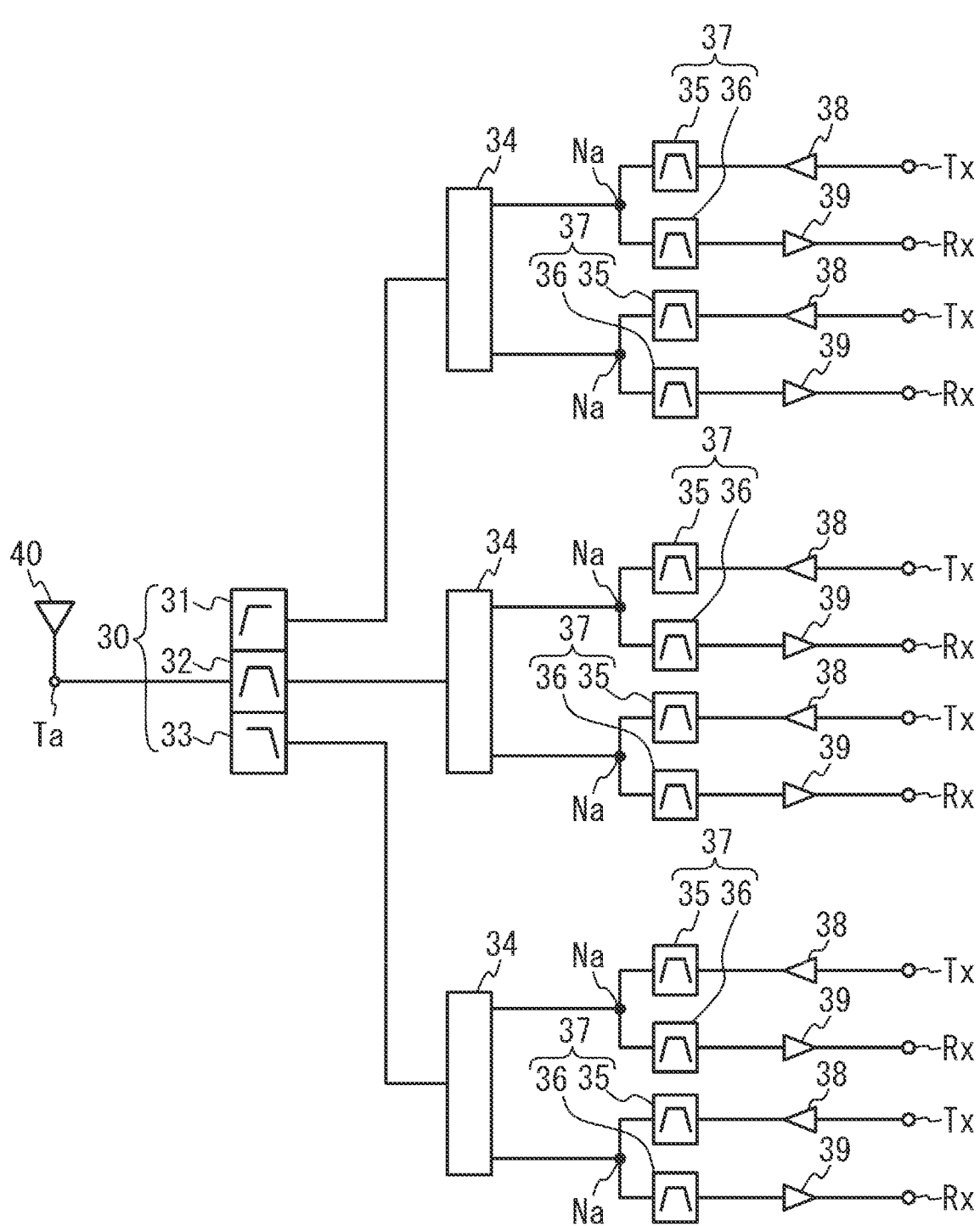
FIG. 19 is a circuit diagram of a front-end circuit in which a communication module in accordance with a second embodiment is used.

A second embodiment is an example of a multiplexer and a communication module in which the first embodiment and the variations thereof are used. FIG. 19 is a circuit diagram of a front-end circuit in which the communication module according to the second embodiment is used. As illustrated in FIG. 19, the front-end circuit includes a triplexer 30, switches 34, duplexers 37, power amplifiers (PA) 38, and low-noise amplifiers (LNA) 39. The triplexer 30 includes a high-pass filter (HPF) 31, a band-pass filter (BPF) 32, and a low-pass filter (LPF) 33.

An antenna 40 is connected to a common terminal Ta. First ends of the HPF 31, the BPF 32, and the LPF 33 are commonly coupled to the common terminal Ta. The switches 34 are coupled to second ends of the HPF 31, the BPF 32, and the LPF 33, respectively. The HPF 31 allows high-frequency signals in the high band to pass therethrough and suppresses signals with other frequencies. The BPF 32 allows high-frequency signals in the middle band, which is lower in frequency than the high band, to pass therethrough, and suppresses signals with other frequencies. The LPF 33 allows high-frequency signals in the low band, which is lower in frequency than the middle band, to pass therethrough, and suppresses signals with other frequencies.

Common nodes Na of the duplexers 37 are coupled to the switch 34. Each switch 34 selects one of the duplexers 37 and connects it to the corresponding one of the second ends of the HPF 31, the BPF 32, and the LPF 33. The duplexer 37 includes a transmit filter 35 that is a BPF and a receive filter 36 that is a BPF. The transmit filter 35 and the receive filter 36 are coupled to the PA 38 and the LNA 39, respectively.

The transmission signals input to a transmission terminal Tx are amplified by the PA 38. The transmit filter 35 outputs high-frequency signals in the transmit band among the amplified signals to the common node Na and suppresses signals with other frequencies. The filtered transmit signal passes through the switch 34 and either the HPF 31, the BPF 32 or the LPF 33 and is output from the antenna 40.

The reception signal input to the antenna 40 passes through either the HPF 31, the BPF 32, or the LPF 33 and the switch 34. The receive filter 36 allows signals in the receive band among high-frequency signals input to the common node Na to pass therethrough and suppresses signals with other frequencies. The filtered reception signal is amplified by the LNA 39 and output to the receive terminal Rx.

The filter according to any one of the first embodiment and the variations thereof can be used for the LPF 33 of the triplexer 30. The multilayer electronic component may include, in addition to the LPF 33, at least one of the BPF 32 or the HPF 31. Although the triplexer 30 has been described as an example of the multiplexer, the multiplexer may be a diplexer, a duplexer, or a quadplexer.

Although the embodiments of the present invention have been described in detail, the present invention is not limited to such a specific embodiment, and it is to be understood that the various change, substitutions, and alterations could be made hereto without departing from the spirit and scope of the invention.

What is claimed is:
1. A multilayer electronic component comprising:
   a multilayer structure in which dielectric layers are stacked in a stack direction, the multilayer structure having a first surface and a second surface provided on respective sides in the stack direction;
   a first side-surface electrode provided on a side surface of the multilayer structure;
   an inductor provided in the multilayer structure;
   a plurality of capacitors provided between the inductor and the first surface;

a via wiring line that penetrates through dielectric layers from a first dielectric layer to a second dielectric layer, and electrically connects a first end of the inductor and the first side surface electrode, the first dielectric layer being in contact with the inductor, the second dielectric layer being located closer to the first surface than all of the plurality of capacitors;

a second side-surface electrode that is electrically connected to the first side-surface electrode through the inductor and the via wiring line and is provided on the side surface or another side surface of the multilayer structure, and a conductor pattern provided between adjacent dielectric layers between the all of the plurality of capacitors and the first surface, the conductor pattern electrically connecting the via wiring line and the first side-surface electrode.

2. The multilayer electronic component according to claim 1, wherein the inductor is not electrically connected to the first side-surface electrode at a position closer to the second surface than a position of the plurality of capacitors.

3. The multilayer electronic component according to claim 1, further comprising another via wiring line that penetrates through the dielectric layers from the first dielectric layer to the second dielectric layer and electrically connects a second end of the inductor to the second side-surface electrode.

4. The multilayer electronic component according to claim 1, further comprising:

a lower-surface electrode provided on the first surface and connected to the first side surface electrode, wherein the via wiring line is connected to the lower-surface electrode.

5. The multilayer electronic component according to claim 1, wherein a planar area of a via wiring line penetrating through at least one dielectric layer of the dielectric layers other than the via wiring line electrically connected between the first side-surface electrode and the second side-surface electrode is greater than a planar area of the via wiring line electrically connected between the first side-surface electrode and the second side surface electrode.

6. The multilayer electronic component according to claim 1, wherein a first end of a first capacitor of the plurality of capacitors is coupled to a path between the first side-surface electrode and the second side surface electrode, and a second end of the first capacitor is coupled to a ground electrode provided on a surface of the multilayer structure.

7. The multilayer electronic component according to claim 1, wherein at least a part of the via wiring line does not overlap with the first side-surface electrode in a thickness direction of the first side-surface electrode.

8. The multilayer electronic component according to claim 1, wherein a distance between the via wiring line and the first side-surface electrode is 50 μm or greater.

9. A multilayer electronic component comprising:

a multilayer structure in which dielectric layers are stacked in a stack direction, the multilayer structure having a first surface and a second surface provided on respective sides in the stack direction;

a first side-surface electrode provided on a side surface of the multilayer structure;

an inductor provided in the multilayer structure;

a plurality of capacitors provided between the inductor and the first surface;

a via wiring line that penetrates through dielectric layers from a first dielectric layer to a second dielectric layer, and electrically connects a first end of the inductor and the first side surface electrode, the first dielectric layer being in contact with the inductor, the second dielectric layer being located closer to the first surface than all of the plurality of capacitors;

a second side-surface electrode that is electrically connected to the first side-surface electrode through the inductor and the via wiring line and is provided on the side surface or another side surface of the multilayer structure, and a low-pass filter including the inductor and the plurality of capacitors.

10. The multilayer electronic component according to claim 9, further comprising a multiplexer including the low-pass filter.

* * * * *